United States Patent
Shenbagam et al.

(10) Patent No.: US 12,008,417 B2
(45) Date of Patent: *Jun. 11, 2024

(54) INTERCONNECT-BASED RESOURCE ALLOCATION FOR RECONFIGURABLE PROCESSORS

(71) Applicant: SambaNova Systems, Inc., Palo Alto, CA (US)

(72) Inventors: Raghunath Shenbagam, San Jose, CA (US); Ravinder Kumar, Fremont, CA (US)

(73) Assignee: SambaNova Systems, Inc., Palo Alto, CA (US)

( * ) Notice: Subject to any disclaimer, the term of this patent is extended or adjusted under 35 U.S.C. 154(b) by 142 days.

This patent is subject to a terminal disclaimer.

(21) Appl. No.: 17/528,081

(22) Filed: Nov. 16, 2021

(65) Prior Publication Data

US 2022/0308935 A1  Sep. 29, 2022

Related U.S. Application Data

(63) Continuation of application No. 17/214,768, filed on Mar. 26, 2021, now Pat. No. 11,200,096.

(51) Int. Cl.
*G06F 9/50* (2006.01)
*G06F 9/445* (2018.01)
(Continued)

(52) U.S. Cl.
CPC ........ *G06F 9/5077* (2013.01); *G06F 9/44505* (2013.01); *G06F 9/45558* (2013.01);
(Continued)

(58) Field of Classification Search
None
See application file for complete search history.

(56) References Cited

U.S. PATENT DOCUMENTS 5,684,980 A  11/1997 Casselman
6,470,485 B1  10/2002 Cote et al.
(Continued)

FOREIGN PATENT DOCUMENTS

EP  1372084 A2  12/2003
JP  2020112901 A  7/2020
(Continued)

OTHER PUBLICATIONS

Iqbal et al., Reconfigurable Processor Architecture for High Speed Applications, IEEE, dated 2009, pp. 624-629.
(Continued)

*Primary Examiner* — Lewis A Bullock, Jr.
*Assistant Examiner* — Melissa A Headly
(74) *Attorney, Agent, or Firm* — Flagship Patents; Sikander M. Khan; Bruce A. Young

(57) ABSTRACT

The technology disclosed relates to interconnect-based resource allocation for reconfigurable processors. In particular, the technology disclosed relates to a runtime logic that is configured to receive target interconnect bandwidth and target interconnect latency, and rated interconnect bandwidth and rated interconnect latency. The runtime logic is further configured to respond by allocating, to configuration files defining an application graph, processing elements in a plurality of processing elements, and interconnects between the processing elements, and executing the configuration files using the allocated processing elements and the allocated interconnects.

1 Claim, 23 Drawing Sheets

(10 of 23 Drawing Sheet(s) Filed in Color)

(51) Int. Cl.
*G06F 9/455* (2018.01)
*G06F 15/78* (2006.01)
*H04L 41/0896* (2022.01)
*H04L 47/28* (2022.01)

(52) U.S. Cl.
CPC ........ *G06F 9/5044* (2013.01); *G06F 15/7892* (2013.01); *H04L 47/28* (2013.01); *G06F 2009/4557* (2013.01); *G06F 2009/45595* (2013.01); *G06F 2209/5011* (2013.01); *G06F 2213/0062* (2013.01); *G06F 2213/0064* (2013.01); *H04L 41/0896* (2013.01)

(56) References Cited

U.S. PATENT DOCUMENTS

| | | | |
|---|---|---|---|
| 6,539,438 | B1 | 3/2003 | Ledzius et al. |
| 6,667,983 | B1 | 12/2003 | Lo et al. |
| 8,745,626 | B1* | 6/2014 | Sandstrom .......... G06F 15/7867 712/15 |
| 9,009,723 | B2 | 4/2015 | Degenaro et al. |
| 9,501,325 | B2 | 11/2016 | Pell et al. |
| 10,511,479 | B2 | 12/2019 | Xie et al. |
| 10,621,138 | B2 | 4/2020 | Hu et al. |
| 10,802,870 | B2 | 10/2020 | Lu |
| 10,831,507 | B2 | 11/2020 | Shah et al. |
| 10,831,523 | B2 | 11/2020 | Kochevar-Cureton et al. |
| 10,877,822 | B1 | 12/2020 | Wang et al. |
| 11,080,227 | B2 | 8/2021 | Koeplinger et al. |
| 11,182,221 | B1 | 11/2021 | Sivaramakrishnan et al. |
| 11,182,264 | B1 | 11/2021 | Sivaramakrishnan et al. |
| 11,184,439 | B2 | 11/2021 | Eran et al. |
| 11,200,096 | B1 | 12/2021 | Shenbagam et al. |
| 11,237,880 | B1 | 2/2022 | Raumann et al. |
| 11,347,965 | B2 | 5/2022 | Dutta et al. |
| 11,360,800 | B2 | 6/2022 | Kochevar-Cureton et al. |
| 11,392,740 | B2 | 7/2022 | Raumann et al. |
| 11,436,429 | B2 | 9/2022 | Jaganathan et al. |
| 2002/0156998 | A1 | 10/2002 | Casselman |
| 2003/0108119 | A1 | 6/2003 | Mohebbi et al. |
| 2006/0012395 | A1 | 1/2006 | Huppenthal et al. |
| 2006/0015712 | A1 | 1/2006 | Ang et al. |
| 2007/0186126 | A1 | 8/2007 | Smith et al. |
| 2007/0220522 | A1 | 9/2007 | Coene et al. |
| 2008/0013448 | A1 | 1/2008 | Horie et al. |
| 2009/0089475 | A1 | 4/2009 | Chitlur |
| 2009/0172351 | A1 | 7/2009 | Vorbach et al. |
| 2009/0300209 | A1 | 12/2009 | Elzur |
| 2014/0137123 | A1 | 5/2014 | Hartmann et al. |
| 2014/0258438 | A1 | 9/2014 | Ayoub |
| 2015/0058614 | A1 | 2/2015 | Degenaro et al. |
| 2015/0100971 | A1 | 4/2015 | Dube et al. |
| 2015/0106823 | A1 | 4/2015 | Canoy et al. |
| 2016/0308719 | A1 | 10/2016 | Putnam et al. |
| 2016/0314025 | A1 | 10/2016 | McGarry et al. |
| 2016/0378550 | A1 | 12/2016 | Monfort et al. |
| 2017/0220499 | A1 | 8/2017 | Gray |
| 2017/0289060 | A1* | 10/2017 | Aftab .................... H04L 41/145 |
| 2017/0315815 | A1 | 11/2017 | Smith et al. |
| 2017/0317679 | A1 | 11/2017 | Suh et al. |
| 2018/0285295 | A1 | 10/2018 | Abel et al. |
| 2018/0307950 | A1 | 10/2018 | Nealis et al. |
| 2018/0308200 | A1 | 10/2018 | Surti et al. |
| 2018/0314941 | A1 | 11/2018 | Lie et al. |
| 2018/0315158 | A1 | 11/2018 | Nurvitadhi et al. |
| 2019/0089616 | A1 | 3/2019 | Chabbi et al. |
| 2019/0138890 | A1 | 5/2019 | Liang et al. |
| 2019/0171604 | A1 | 6/2019 | Brewer |
| 2019/0171612 | A1 | 6/2019 | Shahar et al. |
| 2019/0180176 | A1 | 6/2019 | Yudanov et al. |
| 2019/0258921 | A1 | 8/2019 | Lie et al. |
| 2019/0286973 | A1 | 9/2019 | Kovvuri et al. |
| 2019/0347136 | A1* | 11/2019 | Miyoshi .............. G06F 11/3031 |
| 2019/0384642 | A1 | 12/2019 | Bolkhovitin et al. |
| 2020/0090313 | A1 | 3/2020 | Bugdary et al. |
| 2020/0142857 | A1 | 5/2020 | Catiller et al. |
| 2020/0151573 | A1 | 5/2020 | Das et al. |
| 2020/0174840 | A1 | 6/2020 | Zhao et al. |
| 2020/0183745 | A1 | 6/2020 | Ernst et al. |
| 2020/0226444 | A1 | 7/2020 | Sharma et al. |
| 2020/0264876 | A1 | 8/2020 | Lo et al. |
| 2020/0301898 | A1 | 9/2020 | Samynathan et al. |
| 2020/0314181 | A1 | 10/2020 | Eran |
| 2020/0326992 | A1 | 10/2020 | Jin et al. |
| 2020/0341930 | A1 | 10/2020 | Cannata et al. |
| 2021/0011770 | A1 | 1/2021 | Prabhakar et al. |
| 2021/0089343 | A1 | 3/2021 | Hyoudou |
| 2021/0097366 | A1 | 4/2021 | Wagner et al. |
| 2021/0097379 | A1 | 4/2021 | Yang et al. |
| 2021/0103820 | A1 | 4/2021 | Ghosh |
| 2021/0125058 | A1 | 4/2021 | Chowdhury et al. |
| 2021/0192357 | A1 | 6/2021 | Sinha et al. |
| 2021/0192358 | A1 | 6/2021 | Song et al. |
| 2021/0200610 | A1 | 7/2021 | Chu et al. |
| 2021/0241093 | A1 | 8/2021 | Byrne et al. |
| 2022/0001977 | A1 | 1/2022 | Netzer |
| 2022/0058034 | A1 | 2/2022 | Grohoski et al. |
| 2022/0197714 | A1 | 6/2022 | Raumann et al. |
| 2022/0198117 | A1 | 6/2022 | Raumann et al. |
| 2022/0269534 | A1 | 8/2022 | Misra et al. |
| 2022/0308935 | A1 | 9/2022 | Shenbagam et al. |

FOREIGN PATENT DOCUMENTS

| | | | |
|---|---|---|---|
| TW | 202240386 | A | 10/2022 |
| TW | 202240394 | A | 10/2022 |
| TW | 202248853 | A | 12/2022 |
| WO | 2010142987 | A1 | 12/2010 |
| WO | 2022133047 | A1 | 6/2022 |
| WO | 2022182573 | A1 | 9/2022 |
| WO | 2022203925 | A1 | 9/2022 |

OTHER PUBLICATIONS

Liang et al., Dynamic Coarse Grain Dataflow Reconfiguration Technique for Real-Time Systems, IEEE, dated 2005, pp. 3511-3514.

Padole et al., Configuration Memory Based Dynamic Coarse Grained Reconfigurable Multiscore Architecture, IEEE 2013, pp. 3511-3514, 5 pages.

Paek et al., "Binary Acceleration Using Coarse-Grained Reconfigurable Architecture," ACM SIGARCH Computer Architecture News, vol. 38, No. 4, Sep. 2010, 7 pages.

U.S. Appl. No. 17/185,264—Non-Final Office Action, dated Jan. 26, 2023, 9 pages.

U.S. Appl. No. 17/522,655—Notice of Allowance, dated Nov. 16, 2022, 21 pages.

U.S. Appl. No. 17/522,658—Notice of Allowance, dated Dec. 14, 2022, 22 pages.

U.S. Appl. No. 17/522,682—Notice of Allowance, dated Jan. 11, 2023, 23 pages.

U.S. Appl. No. 17/522,682—Supplemental Notice of Allowance, dated Jan. 24, 2023, 2 pages.

U.S. Appl. No. 17/522,694—Non-Final Office Action, dated Mar. 31, 2023, 29 pages.

Dettmers, How to Parallelize Deep Learning on GPUs Part 1 of 2: Data Parallelism, dated Oct. 9, 2014, 19 pages. Retrieved on Sep. 3, 2021. Retrieved from [URL: https://timdettmers.com/2014/10/09/deep-learning-data-parallelism/].

Ekanayake, Model Parallelism in Deep Learning is Not What you think, dated Nov. 10, 2018, 4 pages. Retrieved on Sep. 3, 2021. Retrieved from [ URL: https://medium.com/@esaliya/model-parallelism-in-deep-learning-is-not-what-you-think-94d2f81e82ed ].

What is the difference between model parallelism and data parallelism, Quora, 14 pages. Retrieved on Sep. 3, 2021. Retrieved from [URL: https://www.quora.com/What-is-the-difference-between-model-parallelism-and-data-parallelism ].

Dettmers, How to Parallelize Deep Learning on GPUs Part 2 of 2: Model Parallelism, dated Nov. 9, 2014, 19 pages. Retrieved on Sep.

(56) References Cited

OTHER PUBLICATIONS 3, 2021. Retrieved from [URL: https://timdettmers.com/2014/11/09/model-parallelism-deep-learning/ ].
Mazur, A step by step backpropagation example, dated Mar. 17, 2015, 26 pages. Retrieved on Sep. 3, 2021. Retrieved from [URL: https://mattmazur.com/2015/03/17/a-step-by-step-backpropagation-example/ ].
U.S. Appl. No. 17/214,768 Supplemental Notice of Allowance, dated Aug. 25, 2021, 10 pages.
U.S. Appl. No. 17/214,768 Notice of Allowance, dated Aug. 11, 2021, 26 pages.
Xiandong Qi, Introduction to Distributed Deep Learning, dated May 13, 2017, 13 pages.
Jackson et al., PCI Express Technology Comprehensive Guide to Generation 1.x, 2.x and 3.0, dated Jun. 2020, 1057 pages.
NVIDIA, "NVIDIA Turing GPU Architecture", WP-09183-001_v01, 2018, 86 pages.
Ruder, An overview of gradient descent optimization algorithms, NUI Galway Aylien Lyd, dated Jun. 15, 2017, 14 pages.
Woolloy, NCCL: Accelerated Multi-GPU Collective Communications, NVIDIA, 56 pages.
Koeplinger, et al., "Spatial A Language and Compiler for Application Accelerators", Jun. 18-22, 2018, 16pages.
Prabhakar, et al., "Plasticine: A Reconfigurable Architecture for Parallel Patterns", pp. 389-402, IEEE, Jun. 24, 2017.
Accelerated Computing with a Reconfigurable Dataflow Architecture, SambaNova Systems Whitepaper, 10 pages.
NVIDIA, "NVIDIA DGX-1 System Architecture", WP-08437-001_v02, 2017, 33 pages.
Goodfellow et al., Deep Learning Book Chapter 6 Deep Feedforward Networks, 2016, 60 pages.
NVIDIA, "NVIDIA Tesla P100", WP-08019-001 v01.1, 2016, 45 pages.
Marshall, Dave, "Remote Procedure Calls (RPC)", Jan. 5, 1999, 15 pages, Retreived from URL <https://users.cs.cf.ac.uk/Dave.Marshall/C/node33.html#S ECTION 00330000000000000000>.
Tanaka et. al., Distributed Deep Learning with GPU-FPGA heterogenous computing, IEEE 2021, 9 pages.
Kachris et al.; "A Survey on Reconfigurable Accelerators for Cloud Computing", IEEE 2016, Aug. 29, 2016, pp. 1-11.
Podobas et al, A Survey on Coarse-Grained Reconfigurable Architectures From a Performance Perspective, IEEEAccess, vol. 2020. 3012084, Jul. 27, 2020, 25 pages.
M. Emani et al., "Accelerating Scientific Applications With SambaNova Reconfigurable Dataflow Architecture," in Computing in Science & Engineering, vol. 23, No. 2, pp. 114-119, Mar. 1-Apr. 2021, doi: 10.1109/MCSE.2021.3057203.
Strom, Scalable Distributed DNN Training Using Commodity GPU Cloud Computing, Amazon.com, 5 pages.
Li, Ang, et al., "Evaluating Modern GPU Interconnect: PCIe, NVLink, NV-SLI, NVSwitch and GPUDirect", Mar. 11, 2019, 15 pages.
Mao, Data Parallelism vs Model Parallelism in Distributed Deep Learning Training, dated Mar. 23, 2019, 4 pages, retrieved on Mar. 30, 2021, Retrieved from the internet [ URL: https://leimao.github.io].
U.S. Appl. No. 17/127,818—Notice of Allowance, dated Jul. 21, 2021, 10 pages.
Insujang, GPU Architecture Overview, Better Tomorrow with Computer Science, published Apr. 27, 2017, retrieved on Jun. 17, 2021, retrieved from the Internet [ URL: https://insujang.github.io/2017-04-17/gpu-architecture-overview/].
Liu et al., Offloading distributed Applications onto SmartNICs using iPipe, ACM 2019, pp. 1-16.
Ericles, Sousa, et al. "A Reconfigurable Memory Architecture for System Integration of Coarse-Grained Reconfigurable Arrays", 2017 International Conference on ReConFigurable Computing and FPGAs, Dec. 4-6, 2017, 8 pages.
Jin et. al., How to scale distributed deep learning, dated Nov. 14, 2016, 16 pages.
U.S. Appl. No. 17/127,929—Office Action dated Apr. 1, 2021, 26 pages.
NVIDIA, "NVIDIA DGX-1 With Tesla V100 System Architecture", WP-08437-002_v01, 2017, 43 pages.
Knodel, Oliver, et al., "RC3E: Reconfigurable Accelerators in Data Centers and their Provision by Adapted Service Models", IEEE 9th International Converence on Cloud Computing, 2016, pp. 1-8.
U.S. Appl. No. 17/127,818—Office Action dated Apr. 1, 2021, 15 pages.
U.S. Appl. No. 17/127,929 Notice of Allowance, dated Jul. 21, 2021, 14 pages.
Zhang et. al., Dive into Deep Learning, Release 0.16.2, dated Mar. 20, 2021, 1027 pages.
Donges, Gradient Descent: An Introduction to Machine Learning's Most Popular Algorithms, dated Jun. 16, 2019, 10 pages. Retrieved on Mar. 24, 2021, retrieved from [URL: https://builtin.com/data-science/gradient-descent ].
Lecture 11: Distributed Training and Communication Protocols, CSE599W: Spring 2018, UW Paul G. Allen School of Computer Science and Engineering, 41 pages.
Bae et al., "Auto-tuning CNNs for coarse-grained reconfigurable array-based accelerators"; IEEE 2018 (Bae_2018.pdf; pp. 1-10) (Year: 2018).
Li et al., "Caterpillar: coarse grain reconfigurable architecture for accelerating the training of deep neural networks"; IEEE 2017 (Li_2017.pdf; pp. 1-10) (Year: 2017).
Ma et al.; "DeepGauge: Multi-Granularity Testing Criteria for Deep Learning Systems"; ACM 2018 (Ma_2018.pdf; pp. 1-12) (Year: 2018).
U.S. Appl. No. 17/379,924 Notice of Allowance, dated Sep. 16, 2021, 51 pages.
U.S. Appl. No. 17/379,921 Notice of Allowance, dated Nov. 26, 2021, 34 pages.
Busa et. al., A Run-Time World-Level Reconfigurable Coarse-Grain Functional Unit for a VLIW Processor, ACM, dated 2002, 6 pages.
Jafri et al., NeuroCGRA: A CGRA with support for Neural Networks, IEEE, dated 2014, 6 pages.
Rubattu et al., Dataflow-Functional High-Level Synthesis for Coarse-Grained Reconfigurable Accelerators, IEEE Embedded Systems Letters, vol. 11, No. 3, dated Sep. 2019, 4 pages.
U.S. Appl. No. 17/127,818—Response to Office Action dated Apr. 1, 2021, filed Jul. 1, 2021, 15 pages.
U.S. Appl. No. 17/127,929—Response to Office Action dated Apr. 1, 2021, dated Jul. 1, 2021, 10 pages.
U.S. Appl. No. 17/379,921 Notice of Allowance dated Mar. 21, 2022, 25 pages.
PCT/US2021/063733—International Search Report and Written Opinion, dated Apr. 4, 2022, 17 pages.
PCT/US2021/063728—International Search Report and Written Opinion, dated Apr. 4, 2022, 15 pages.
Galanis et al., Partitioning Methodology for Heterogeneous Reconfigurable Functional Units, The Journal of Supercomputing, vol. 38, No. 1, dated Oct. 1, 2006, 18 pages.
Galanis et al., A design flow for speeding-up dsp applications in heterogeneous reconfigurable systems, Microelectronics Journal, vol. 37, dated 2006, pp. 554-564, 11 pages.
Galanis et al., Accelerating Applications by Mapping Critical Kernels on Coarse-Grain Reconfigurable Hardware in Hybrid Systems, Field-Programmable Custom Computing Machines, 2005, 13th Annual IEEE Symposium on Napa, CA Apr. 2005, 2 pages.
PCT/US2022/020638—International Search Report and Written Opinion, dated Jun. 21, 2022, 17 pages.
PCT/US2022/016871—International Search Report and Written Opinion, dated Jun. 1, 2022, 14 pages.
Vucha et al., Dynamic Task Distribution Model for On-Chip Reconfigurable High Speed Computing System, Hindawi, dated Jun. 30, 2015, 13 pages.
Souissi et al., Optimization of Run-time Mapping on Heterogeneous CPU/FPGA Architecture, 9th International Conference of Modeling, Optimization and Simulation—MOSIM'12, Jun. 6-8, 2012, Bordeaux, France, 9 pages.

(56) References Cited

OTHER PUBLICATIONS

Fazlali et al., Efficient task scheduling for runtime reconfigurable systems, Journal of Systems Architecture, vol. 56, dated Jul. 26, 2010, pp. 623-632, 10 pages.

* cited by examiner

Comparing Target Link Bandwidths to Rated Link Bandwidths — 200

Specification of Target Link Bandwidths

| Source: VRP0 | VRP0 to VRP1 | VRP0 to VRP2 | VRP0 to VRP3 |
|---|---|---|---|
| Virtual Link1 | 10 GB/s | 12 GB/s | 15 GB/s |
| Virtual Link2 | 15 GB/s | 10 GB/s | 10 GB/s |

Rated Link Bandwidths

| From RP0 | RP0 to RP1 | RP0 to RP2 | RP0 to RP3 |
|---|---|---|---|
| Link1 | 20 GB/s | 10 GB/s | 25 GB/s |
| Link2 | 5 GB/s | N/A | 5 GB/s |
| Link3 | N/A | N/A | 32 GB/s |

First Specification of Target Link Latency as Normalized Scores

| Source: VRP0 | VRP0 to VRP1 | VRP0 to VRP2 | VRP0 to VRP3 |
|---|---|---|---|
| Target Link Latency1 | 20 | 30 | 60 |
| Target Link Latency2 | 80 | 70 | 40 |

Resource Allocator Routing Table of Normalized Scores

| Source: RP0 | RP0 to RP1 | RP0 to RP2 | RP0 to RP3 |
|---|---|---|---|
| Rated Link1 (Score) | 60 | 20 | 70 |
| Rated Link2 (Score) | 40 | 80 | 30 |

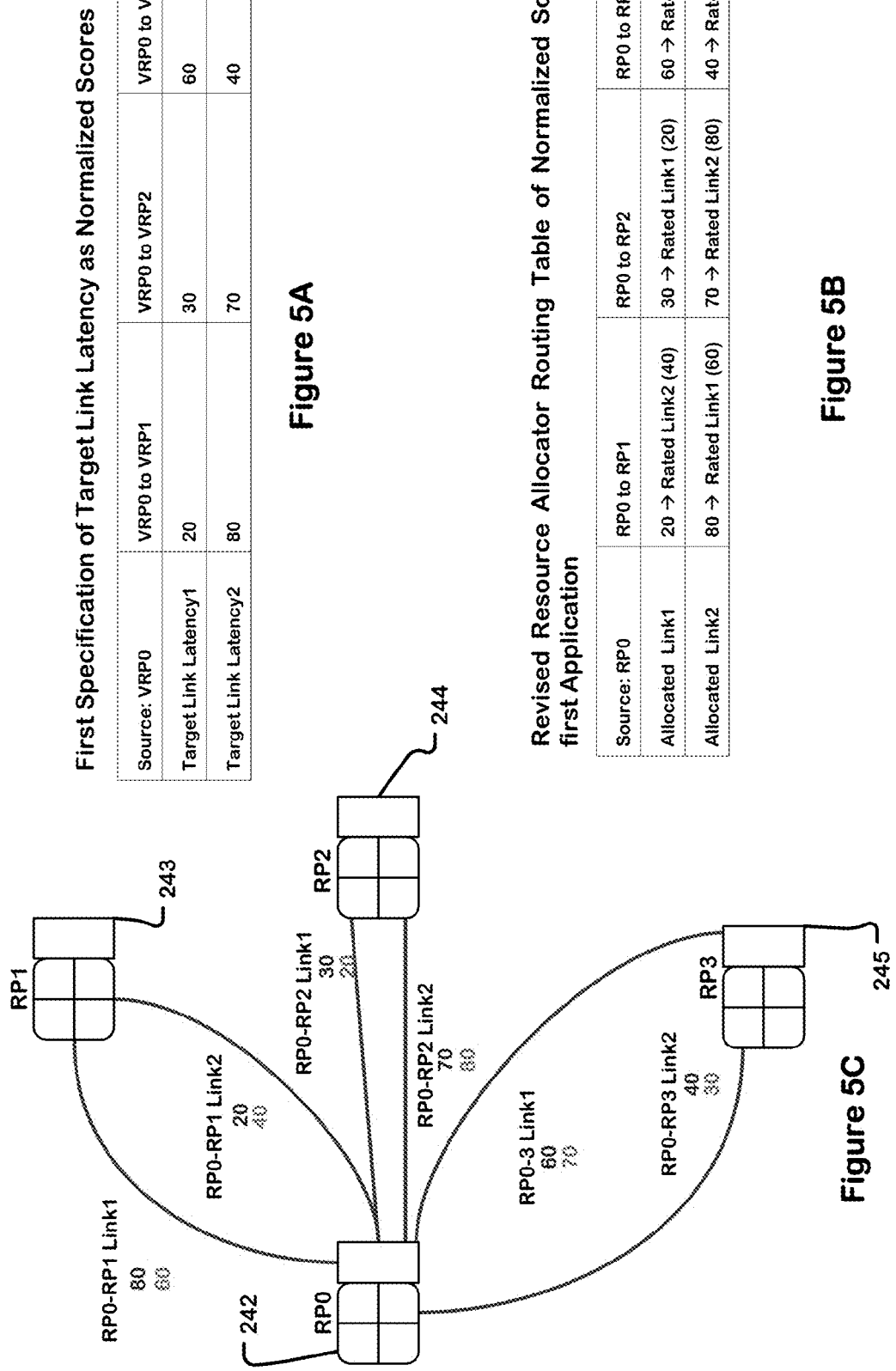

Second Specification of Target Link Latency as Normalized scores

| Source: VRP0 | VRP0 to VRP1 | VRP0 to VRP2 | VRP0 to VRP3 |
|---|---|---|---|
| Target Link Latency1 | 30 | 35 | 55 |
| Target Link Latency2 | 70 | 65 | 45 |

Resource Allocator Routing Table of Normalized Scores

| Source: RP0 | RP0 to RP1 | RP0 to RP2 | RP0 to RP3 |
|---|---|---|---|
| Rated Link1 (Score) | 60 | 20 | 70 |
| Rated Link2 (Score) | 40 | 80 | 30 |

Second Specification of Target Link Latency as Normalized Scores

| Source: VRP0 | VRP0 to VRP1 | VRP0 to VRP2 | VRP0 to VRP3 |
|---|---|---|---|
| Target Link Latency 1 | 30 | 35 | 55 |
| Target Link Latency 2 | 70 | 65 | 45 |

Figure 7A

Revised Resource Allocator Routing Table of Normalized Scores for a Second Application

| Source: RP0 | RP0 to VRP1 | RP0 to VRP2 | RP0 to VRP3 |
|---|---|---|---|
| Allocated Link1 | 30 → Rated Link2 (40) | 35 → Rated Link1 (20) | 55 → Rated Link 1 (70) |
| Allocated Link2 | 70 → Rated Link1 (60) | 65 → Rated Link2 (80) | 45 → Rated Link 2 (30) |

Figure 7B

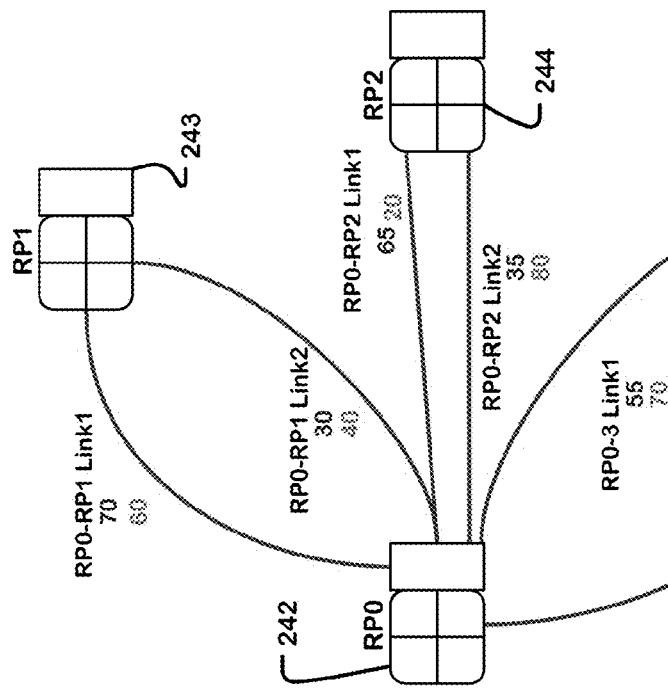
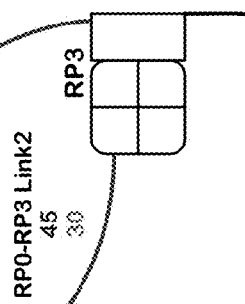

Figure 7C

INTRA-NODE GRAPH: RP0--RP7--RP1--RP5
INTRA-NODE THREE HOP LATENCY WITH FABRIC DELAY FOR GRAPH: RP0-- HOP(1)--RP7--HOP(2)--RP1--HOP(3)--RP5

INTERCONNECT-BASED RESOURCE ALLOCATION FOR RECONFIGURABLE PROCESSORS

PRIORITY APPLICATION

This application is a continuation of co-pending U.S. Nonprovisional patent application Ser. No. 17/214,768, filed Mar. 26, 2021, entitled "Resource Allocation for Reconfigurable Processors".

INCORPORATIONS

The following are incorporated by reference for all purposes as if fully set forth herein:

U.S. Nonprovisional patent application Ser. No. 17/214,768, filed Mar. 26, 2021, entitled "Resource Allocation for Reconfigurable Processors";

Prabhakar et al., "Plasticine: A Reconfigurable Architecture for Parallel Patterns," ISCA '17, Jun. 24-28, 2017, Toronto, ON, Canada;

Koeplinger et al., "Spatial: A Language and Compiler for Application Accelerators," *Proceedings Of The 39th ACM SIGPLAN Conference On Programming Language Design And Implementation* (PLDI), Proceedings of the 43rd International Symposium on Computer Architecture, 2018;

U.S. Nonprovisional patent application Ser. No. 16/239,252, filed Jan. 3, 2019, titled, "VIRTUALIZATION OF A RECONFIGURABLE DATA PROCESSOR,";

U.S. Nonprovisional patent application Ser. No. 16/197,826, filed Nov. 21, 2018, titled, "CONFIGURATION LOAD OF A RECONFIGURABLE DATA PROCESSOR,";

U.S. Nonprovisional patent application Ser. No. 16/198,086, filed Nov. 21, 2018, titled, "CONFIGURATION UNLOAD OF A RECONFIGURABLE DATA PROCESSOR,";

U.S. Nonprovisional patent application Ser. No. 16/260,548, filed Jan. 29, 2019, titled, "MATRIX NORMAL/TRANSPOSE READ AND A RECONFIGURABLE DATA PROCESSOR INCLUDING SAME,";

U.S. Nonprovisional patent application Ser. No. 16/536,192, filed Aug. 8, 2019, titled, "COMPILER FLOW LOGIC FOR RECONFIGURABLE ARCHITECTURES,";

U.S. Nonprovisional patent application Ser. No. 16/407,675, filed May 9, 2019, titled, "CONTROL FLOW BARRIER AND RECONFIGURABLE DATA PROCESSOR,";

U.S. Nonprovisional patent application Ser. No. 16/504,627, filed Jul. 8, 2019, titled, "QUIESCE RECONFIGURABLE DATA PROCESSOR,";

U.S. Nonprovisional patent application Ser. No. 16/572,516, filed Sep. 16, 2019, titled, "EFFICIENT EXECUTION OF OPERATION UNIT GRAPHS ON RECONFIGURABLE ARCHITECTURES BASED ON USER SPECIFICATION,";

U.S. Nonprovisional patent application Ser. No. 16/744,077, filed Jan. 15, 2020, titled, "COMPUTATIONALLY EFFICIENT SOFTMAX LOSS GRADIENT BACKPROPAGATION,";

U.S. Nonprovisional patent application Ser. No. 16/590,058, filed Oct. 1, 2019, titled, "COMPUTATION UNITS FOR FUNCTIONS BASED ON LOOKUP TABLES,";

U.S. Nonprovisional patent application Ser. No. 16/695,138, filed Nov. 25, 2019, titled, "COMPUTATIONAL UNITS FOR BATCH NORMALIZATION,";

U.S. Nonprovisional patent application Ser. No. 16/688,069, filed Nov. 19, 2019, titled, "LOOK-UP TABLE WITH INPUT OFFSETTING,";

U.S. Nonprovisional patent application Ser. No. 16/718,094, filed Dec. 17, 2019, titled, "COMPUTATIONAL UNITS FOR ELEMENT APPROXIMATION,";

U.S. Nonprovisional patent application Ser. No. 16/560,057, filed Sep. 4, 2019, titled, "SIGMOID FUNCTION IN HARDWARE AND A RECONFIGURABLE DATA PROCESSOR INCLUDING SAME,";

U.S. Nonprovisional patent application Ser. No. 16/572,527, filed Sep. 16, 2019, titled, "PERFORMANCE ESTIMATION-BASED RESOURCE ALLOCATION FOR RECONFIGURABLE ARCHITECTURES,";

U.S. Nonprovisional patent application Ser. No. 15/930,381, filed May 12, 2020, titled, "COMPUTATIONALLY EFFICIENT GENERAL MATRIX-MATRIX MULTIPLICATION (GeMM),";

U.S. Nonprovisional patent application Ser. No. 16/890,841, filed Jun. 2, 2020, titled, "ANTI-CONGESTION FLOW CONTROL FOR RECONFIGURABLE PROCESSORS,";

U.S. Nonprovisional patent application Ser. No. 17/023,015, filed Sep. 16, 2020, titled, "COMPILE TIME LOGIC FOR DETECTING STREAMING COMPATIBLE AND BROADCAST COMPATIBLE DATA ACCESS PATTERNS,";

U.S. Nonprovisional patent application Ser. No. 17/031,679, filed Sep. 24, 2020, titled, "SYSTEMS AND METHODS FOR MEMORY LAYOUT DETERMINATION AND CONFLICT RESOLUTION,";

U.S. Nonprovisional patent application Ser. No. 17/175,289, filed Feb. 12, 2021, titled, "INSTRUMENTATION PROFILING FOR RECONFIGURABLE PROCESSORS,";

U.S. Nonprovisional patent application Ser. No. 16/922,975, filed Jul. 7, 2020, titled, "RUNTIME VIRTUALIZATION OF RECONFIGURABLE DATAFLOW RESOURCES,";

U.S. Nonprovisional patent application Ser. No. 16/996,666, filed Aug. 18, 2020, titled, "RUNTIME PATCHING OF CONFIGURATION FILES,";

U.S. Nonprovisional patent application Ser. No. 17/127,818, filed Dec. 18, 2020, titled, "INTRA-NODE BUFFER-BASED STREAMING FOR RECONFIGURABLE PROCESSOR-AS-A-SERVICE (RPaaS),"; and U.S. Nonprovisional patent application Ser. No. 17/127,929, filed Dec. 18, 2020, titled, "INTER-NODE BUFFER-BASED STREAMING FOR RECONFIGURABLE PROCESSOR-AS-A-SERVICE (RPaaS),".

FIELD OF THE TECHNOLOGY DISCLOSED

The technology disclosed relates to bandwidth and latency optimization in systems and methods that use processors like Central Processing Units (CPUs), Graphics Processing Units (GPUs), Field Programmable Gate Arrays (FPGAs), Coarse-Grained Reconfigurable Architectures (CGRAs), Application-Specific Integrated Circuits (ASICs), Application Specific Instruction-set Processor (ASIP), and Digital Signal Processors (DSPs). In particular, the technology disclosed relates to resource allocation for reconfigurable processors based on link bandwidths and link latencies.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Reconfigurable accelerators, including Field Programmable Gate Arrays (FPGAs), can be configured to implement a variety of functions more efficiently or faster than might be achieved using a general purpose processor executing a computer program. So-called Coarse-Grained Reconfigurable Architectures (CGRAs) are being developed in which configurable units in an array are more complex than used in typical, more fine-grained FPGAs, and can enable faster or more efficient execution of various classes of functions. For example, CGRAs have been proposed that can enable implementation of energy-efficient accelerators for machine learning and artificial intelligence workloads. See, Prabhakar, et al., "Plasticine: A Reconfigurable Architecture for Parallel Patterns," ISCA '17, Jun. 24-28, 2017, Toronto, ON, Canada.

Deep neural networks learn many levels of abstraction, ranging from simple to complex concepts. The strength of deep models is that they are not only powerful but learnable. A deep neural network is trained by feeding it input and letting it compute layer-by-layer to generate output for comparison with a known correct answer. After computing the error at the output, this error flows backward through the network by back-propagation. At each step backward the model parameters are tuned in a direction that tries to reduce the error using a numerical optimization method such as stochastic gradient descent (SGD). This process sweeps over the data improving the model as it goes.

To serve increasingly sophisticated applications and deliver higher quality results, neural networks are becoming exponentially deeper and more complex. At the same time, neural networks deployed in mainstream interactive applications are being driven to infer and predict results faster. As neural networks get deeper and more complex, they provide a dramatic increase in accuracy but training these higher accuracy networks requires much higher computation time, and their complexity increases prediction latency.

Servers with two or more accelerators per host are becoming common as developers increasingly expose and leverage the available parallelism in their applications. While dense accelerator systems provide a great vehicle for scaling single-node performance, multi-accelerator application efficiency can be constrained by the performance of the PCIe (Peripheral Component Link Express) bus connections between accelerators. Similarly, data center applications are growing outside the server enclosure, requiring efficient scaling across multiple linked systems.

Training deep neural networks in parallel across multiple accelerators and/or multiple nodes requires distributing either the input data ("data parallel"), the model being trained ("model parallel"), or a hybrid of the two. Regardless of the approach, parallelizing across accelerators requires synchronization and communication of data (such as gradients) between accelerators. For example, in data-parallel approaches, separate parallel tasks must periodically resynchronize their gradients so that the model parameters are kept in sync across all parallel tasks. This amounts to an all reduce operation.

Scaling is a measure of the improvement in time to solution when increasing the number of parallel processors applied to a problem. A common approach to scaling training deep neural networks is to increase the global batch size as the number of accelerators increases. Perhaps unsurprisingly, these so-called "weak" scaling approaches have high parallel efficiency, even with relatively slow links among accelerators.

A common deep learning workload is the training of convolutional neural networks for computer vision tasks such as image recognition and understanding. Implementations commonly use weak data-parallel scaling for training. The training of recurrent neural networks (RNNs) is another common deep learning workload. Due to high inter-accelerator communication requirements, RNNs—in particular, long short-term memory (LSTM) networks—often benefit more from faster links. RNNs are commonly used for speech recognition and natural language processing. An example is the "Sequence-to-Sequence" (Seq2Seq) neural machine translation (NMT) technique, with several implementations and improvements including Open Neural Machine Translation (Open MT).

Seq2Seq NMT models are used for language translation as well as image and video captioning. Seq2Seq is an RNN made up of an encoder, which ingests an input sequence, and a decoder, which generates the output sequence (e.g., a translation). The encoder and decoder are parameterized by their embedding size, known as the RNN's learning capacity. Increasing the embedding size can improve the network's accuracy at the cost of lower training throughput (as with any other network, care must be taken to not overfit). With larger embeddings, the performance of the links becomes more important.

Multi-system scaling of the latest computational workloads, especially deep learning, requires strong communications between accelerators, both inside the system and between systems, to match the significant accelerator performance of each system and to improve performance of scaling workloads. An opportunity arises to improve bandwidth and reduce latency in accelerator implementations of deep learning models.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The color drawings also may be available in PAIR via the Supplemental Content tab.

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which.

FIG. 5A, same as FIG. 4A, shows an example table representing a first specification for target link latency as normalized scores of a first processing node in the data center of FIG. 1.

FIG. 5B shows an example table representing a revised resource allocator routing table of normalized scores for a first application in a first processing node.

FIG. 5C shows an example color-coded schematic according to a revised resource allocator routing table's matching normalized scores for a first processing node in the data center.

FIG. 7A, same as FIG. 6A, shows an example table representing a second specification for a target link latency numbered as normalized scores for a first processing node in the data center.

FIG. 7B shows a table representing a revised resource allocator routing table of normalized scores for a second application in a first processing node in the data center.

FIG. 7C shows a color-coded schematic according to a revised resource allocator routing table's matching normalized scores for a first processing node in the data center.

SUMMARY

Figure 1:
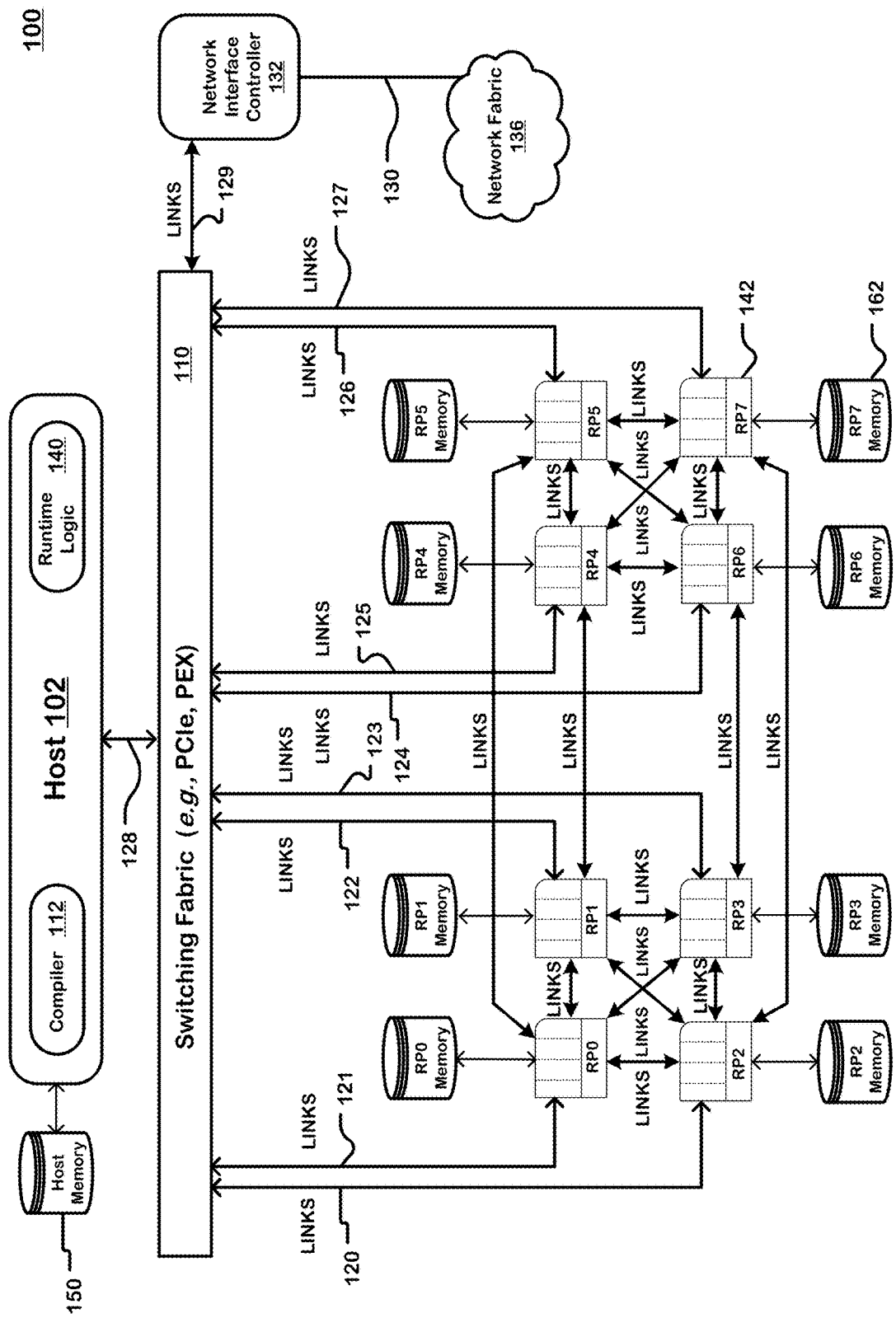
FIG. 1 shows one implementation of an architectural level schematic depicting elements in a first processing node of a data center.

A data processing system is described that comprises a pool of reconfigurable dataflow resources and runtime logic. Reconfigurable dataflow resources in the pool of reconfigurable dataflow resources include a plurality of reconfigurable processors operatively coupled by links. The links have rated link bandwidths and rated link latencies.

The runtime logic is operatively coupled to the pool of reconfigurable dataflow resources, and is configured to receive for a first application: (1) a first plurality of configuration files that contain configuration data; (2) a first configuration of a first plurality of virtual reconfigurable processors required to execute the first application, and virtual links between virtual reconfigurable processors in the first plurality of virtual reconfigurable processors; and (3) a first specification of target link bandwidths and target link latencies of the virtual links between the virtual reconfigurable processors in the first plurality of virtual reconfigurable processors. The runtime logic allocates reconfigurable processors in the plurality of reconfigurable processors to the virtual reconfigurable processors in the first plurality of virtual reconfigurable processors, and allocates links between the reconfigurable processors to the virtual links between the virtual reconfigurable processors in the first plurality of virtual reconfigurable processors based on a link bandwidth comparison and a link latency comparison. The link bandwidth comparison compares the target link bandwidths specified by the first specification against the rated link bandwidths. The link latency comparison compares the target link latencies specified by the first specification against the rated link latencies. The runtime logic configures the allocated reconfigurable processors and the allocated links with configuration data in the first plurality of configuration files, and executes the first application using the configured reconfigurable processors and the configured links.

In one implementation, the first configuration is encoded in a first virtual routing table that specifies a set of virtual links for each pair of virtual reconfigurable processors in the first plurality of virtual reconfigurable processors. In one implementation, the first specification is encoded in the first virtual routing table that specifies a target link bandwidth and a target link latency of each virtual link in the set of virtual links.

In one implementation, the runtime logic is further configured to receive for the first application a routing table that specifies a set of links for each pair of reconfigurable processors in the plurality of reconfigurable processors available to execute the first application.

In one implementation, the routing table specifies a rated link bandwidth and a rated link latency of each link in the set of links.

In one implementation, the runtime logic is further configured to allocate pairs of reconfigurable processors in the plurality of reconfigurable processors to pairs of virtual reconfigurable processors in the first plurality of virtual reconfigurable processors, and further configured to allocate links in the set of links to virtual links in the set of virtual links based on a link bandwidth comparison and a link latency comparison. The runtime logic compares target link bandwidths of the virtual links in the set of virtual links against rated link bandwidths of the links in the set of links. A link latency comparison by the runtime logic compares target link latencies of the virtual links in the set of virtual links against rated link latencies of the links in the set of links. The runtime logic configures the allocated pairs of reconfigurable processors and the allocated links with the configuration data in the first plurality of configuration files. The runtime logic executes the first application using the configured pairs of reconfigurable processors and the configured links.

In one implementation, the runtime logic is further configured to receive for a second application: (1) a second plurality of configuration files that contain configuration data; (2) a second configuration of a second plurality of virtual reconfigurable processors required to execute the second application, and virtual links between virtual reconfigurable processors in the second plurality of virtual reconfigurable processors; and (3) a second specification of target link bandwidths and target link latencies of the virtual links between the virtual reconfigurable processors in the second plurality of virtual reconfigurable processors.

In one implementation, the runtime logic is further configured to receive for the second application revised link bandwidths and revised link latencies of the allocated links. The revised link bandwidths and the revised link latencies result from allocation of parts of the rated link bandwidths and the rated link latencies to the first application. The runtime logic further allocates the allocated reconfigurable processors to the virtual reconfigurable processors in the second plurality of virtual reconfigurable processors, and the allocated links to the virtual links between the virtual reconfigurable processors in the second plurality of virtual reconfigurable processors. The allocations are based on a link bandwidth comparison that compares the target link bandwidths specified by the second specification against the revised link bandwidths, and a link latency comparison that compares the target link latencies specified by the second specification against the revised link latencies. The runtime logic further configures the allocated reconfigurable processors and the allocated links with configuration data in the second plurality of configuration files, and executes the second application using the configured reconfigurable processors and the configured links.

In one implementation, the first and second pluralities of configuration files, the first and second configurations, and the first and second specifications are generated by a compiler.

In one implementation, the routing table is generated by a resource manager.

In one implementation, the rated link latencies are rated based on a number of hops between two reconfigurable processors in the plurality of reconfigurable processors. In one implementation, a hop is an intermediate reconfigurable processor between the two reconfigurable processors. In one implementation, the intermediate reconfigurable processor is operative as a relay. In one implementation, the intermediate reconfigurable processor relay is operative bidirectionally. In one implementation, the intermediate reconfigurable processor relay is operative unidirectionally. In one implementation, a latency value is a time delay for traversing the intermediate reconfigurable processor relay. In one implementation, the latency value for traversing the intermediate reconfigurable processor relay is an a priori known static value for calculating a normalized latency score. In one implementation, the latency delay value for traversing the intermediate reconfigurable processor relay is dependent on configuration routing and is a dynamic value for calculating the normalized latency scores.

In one implementation, rated link latencies of a set of links between the two reconfigurable processors are normalized scores that are normalized across links in the set of links and thereby sum to a ceiling score. In one implementation, target link latencies of a set of virtual links between two virtual reconfigurable processors are normalized scores that are normalized across virtual links in the set of virtual links and thereby sum to the ceiling score.

In one implementation, the rated link bandwidths are rated based on a hardware configuration of the links. In one implementation, the hardware configuration is a data transfer rate of the links. In one implementation, the hardware configuration is a link width of the links. In one implementation, the first and second applications are executed in parallel using the configured reconfigurable processors and the configured links.

In one implementation, execution of the first application using the configured reconfigurable processors and the configured links further includes processing and streaming application data for the first application and outputs generated therefor using the configured reconfigurable processors and the configured links.

In one implementation, execution of the second application using the configured reconfigurable processors and the configured links further includes processing and streaming application data for the second application and outputs generated therefor using the configured reconfigurable processors and the configured links.

In one implementation, the allocated reconfigurable processors are on a same processing node. In one implementation, the allocated reconfigurable processors are on different processing nodes.

In one implementation, the link bandwidth comparison precedes the link latency comparison. In one implementation, the link latency comparison precedes the link bandwidth comparison. In one implementation, the same is unit used to measure and compare the rated link bandwidths and the target link bandwidths. In one implementation, the same unit is used to measure and compare the rated link latencies and the target link latencies.

A data processing system comprises a pool of reconfigurable dataflow resources and runtime logic. The reconfigurable dataflow resources in the pool of reconfigurable dataflow resources include a plurality of reconfigurable processors operatively coupled by links. The links have rated link bandwidths and rated link latencies.

The runtime logic is operatively coupled to the pool of reconfigurable dataflow resources, and is configured to receive: (1) configuration files for first and second applications; (2) a first virtual routing table that specifies a first plurality of virtual reconfigurable processors required to execute the first application, and target link bandwidths and target link latencies of virtual links between the virtual reconfigurable processors in the first plurality of virtual reconfigurable processors; and (3) a second virtual routing table that specifies a second plurality of virtual reconfigurable processors required to execute the second application, and target link bandwidths and target link latencies of virtual links between the virtual reconfigurable processors in the second plurality of virtual reconfigurable processors.

The runtime logic allocates a set of reconfigurable processors in the plurality of reconfigurable processors to the virtual reconfigurable processors in the first plurality of virtual reconfigurable processors and the virtual reconfigurable processors in the second plurality of virtual reconfigurable processors, and links between reconfigurable processors in the set of reconfigurable processors to the virtual links between the virtual reconfigurable processors in the first plurality of virtual reconfigurable processors and the virtual links between the virtual reconfigurable processors in the second plurality of virtual reconfigurable processors, based on a link bandwidth comparison and a link latency comparison. The link bandwidth comparison compares the rated link bandwidths against the target link bandwidths specified by the first virtual routing table and the target link bandwidths specified by the second virtual routing table. The link latency comparison compares the rated link latencies against the target link latencies specified by the first virtual routing table and the target link latencies specified by the second virtual routing table. The runtime logic endeavors to assign reconfigurable processors and links between the reconfigurable processors assigned to each plurality of virtual reconfigurable processors such that target link bandwidths and target link latencies for each plurality of virtual reconfigurable processors meet their respective constraints in view of the rated link latencies and bandwidths.

The runtime logic configures the allocated reconfigurable processors and allocated links with configuration data in the configuration files, and executes the first and second applications using the configured reconfigurable processors and the configured links.

A data processing system comprises a pool of reconfigurable dataflow resources and runtime logic. The reconfigurable dataflow resources in the pool of reconfigurable dataflow resources include a plurality of reconfigurable processors operatively coupled by links. The links have rated link bandwidths and rated link latencies.

The runtime logic is operatively coupled to the pool of reconfigurable dataflow resources, and is configured to receive: (1) the configuration files that define an application; (2) a configuration of virtual reconfigurable processors and virtual links between the virtual reconfigurable processors required to execute the application; and (3) a specification of target link bandwidths and target link latencies of the virtual links.

The runtime logic allocates reconfigurable processors in the plurality of reconfigurable processors to the virtual reconfigurable processors, and allocates links between the reconfigurable processors to the virtual links. The allocations are based on a link bandwidth comparison that compares the target link bandwidths against the rated link bandwidths, and a link latency comparison that compares the target link latencies against the rated link latencies.

The runtime logic configures the allocated reconfigurable processors and the allocated links with configuration data in the configuration files, and executes the application using the configured reconfigurable processors and the configured links.

A system is described that has a node and runtime logic. The node has a plurality of processing elements operatively coupled by interconnects. The runtime logic is configured to receive target interconnect bandwidth, target interconnect latency, rated interconnect bandwidth and rated interconnect latency. The runtime logic responds by allocating to configuration files defined by the application graph: (1) processing elements in the plurality of processing elements, and (2) interconnects between the processing elements. The runtime logic further responds by executing the configuration files using the allocated processing elements and the allocated interconnects.

In one implementation, the processing elements are respective arrays of configurable units. In one implementation, the processing elements are respective tiles configured on an array of configurable units, where each of the tiles comprises a non-overlapping group of configurable units in the array of configurable units.

In one implementation, the processing elements are respective tiles configured across arrays of configurable units, where each of the respective tiles comprises a non-overlapping group of configurable units in a corresponding array of configurable units in the arrays of configurable units. In one implementation, the processing elements are respective configurable units of an array of configurable units. In one implementation, configurable units in the respective configurable units are Pattern Compute Units (PCUs) and Pattern Memory Units (PMUs).

A computer-implemented method is described that includes: (1) allocating processing elements and interconnects between the processing elements to applications requesting execution based on achievable interconnect bandwidth and achievable interconnect latency of the interconnects to satisfy target interconnect bandwidth and target interconnect latency requested by the applications; and (2) executing the applications using the allocated processing elements and the allocated interconnects.

A computer-implemented method is described that includes: (1) allocating processing elements and interconnects between the processing elements to applications requesting execution based on rated bandwidth and rated latency of the interconnects to satisfy target bandwidth and target latency of the applications; and (2) executing the applications using the allocated processing elements and the allocated interconnects.

A computer-implemented method is described that includes: (1) allocating processing elements to applications requesting execution based on data transfer rate between the processing elements; and (2) executing the applications using the allocated processing elements.

In one implementation, the node topology of reconfigurable processors has a Dragonfly cluster implementation providing point-to-point linking in an all-to-all connections using direct links (i.e., without an external switching fabric).

In one implementation, the node topology of reconfigurable processors has a 3D Torus cluster implementation providing point-to-point linking in an all-to-all connections using direct links.

In one implementation, the node topology of reconfigurable processors has a Fat Tree cluster implementation providing point-to-point linking connections using reconfigurable processors links and intermediate reconfigurable processors links. In one implementation, the node topology of reconfigurable processors has a Hypercube cluster implementation providing point-to-point linking in an all-to-all connections using direct links.

In one implementation, the node topology of reconfigurable processors has a HyperX cluster implementation providing point-to-point linking in an all-to-all connections using direct links.

One or more implementations of the technology disclosed, or elements thereof can be implemented in the form of a computer product including a non-transitory computer readable storage medium with computer usable program code for performing the method steps indicated. Furthermore, one or more implementations of the technology disclosed, or elements thereof can be implemented in the form of an apparatus including a memory and at least one processor that is coupled to the memory and operative to perform exemplary method steps. Yet further, in another aspect, one or more implementations of the technology disclosed or elements thereof can be implemented in the form of means for carrying out one or more of the method steps described herein; the means can include (i) hardware module(s), (ii) software module(s) executing on one or more hardware processors, or (iii) a combination of hardware and software modules; any of (i)-(iii) implement the specific techniques set forth herein, and the software modules are stored in a computer readable storage medium (or multiple such media).

These and other features, aspects, and advantages of the technology disclosed will become apparent from the following detailed description of illustrative implementations thereof, which is to be read in connection with the accompanying drawings.

DETAILED DESCRIPTION

The following discussion is presented to enable any person skilled in the art to make and use the technology disclosed and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown but is to be accorded the widest scope consistent with the principles and features disclosed herein.

Data Center

Systems and processes for providing Reconfigurable Processor-as-a-Service (RPaaS) are described. The systems and processes will be described with reference to FIG. 1 showing an architectural level schematic of a node within a data center 100 in accordance with an implementation. Because FIG. 1 is an architectural diagram, certain details of the data center 100 are intentionally omitted to improve the clarity of the description. It may be noted that data center 100 can include the same, more, or fewer elements configured in the same or different manner in other implementations. The discussion of FIG. 1 will be organized as follows. First, the elements of the figure will be described, followed by their interconnections. Then, the use of the elements in the system will be described in greater detail.

FIG. 1 shows elements of a first processing node of a data center 100. In FIG. 1, the processing node is configured to collaboratively execute configuration files for applications in a distributed fashion. One skilled in the art will appreciate that the data center 100 can have any number of processing nodes operatively coupled for data communications through a network 136 (also called herein "network fabric 136"). Examples of the network 136 include a Storage Area Network (SAN) and a Local Area Network (LAN). The SAN can be implemented with a variety of data communications fabrics, devices, and protocols. For example, the fabrics for the SAN can include Fibre Channel, Ethernet, InfiniBand, Serial Attached Small Computer System Interface ('SAS'), or the like. Data communications protocols for use with the SAN can include Advanced Technology Attachment ('ATA'), Fibre Channel Protocol, Small Computer System Interface ('SCSI'), Internet Small Computer System Interface ('iSCSI'), HyperSCSI, Non-Volatile Memory Express ('NVMe') over fabrics, or the like.

The LAN can also be implemented with a variety of fabrics, devices, and protocols. For example, the fabrics for the LAN can include Ethernet (802.3), wireless (802.11), or the like. Data communication protocols for use in the LAN can include Transmission Control Protocol ('TCP'), User Datagram Protocol ('UDP'), Internet Protocol (IP), Hypertext Transfer Protocol ('HTTP'), Wireless Access Protocol ('WAP'), Handheld Device Transport Protocol ('HDTP'), Session Initiation Protocol ('SIP'), Real-time Transport Protocol ('RTP'), or the like.

The network 136 also connects other network components in the data center 100. Examples of other network components include links, switches, routers, load balancers, hypervisors, and Application Programming Interfaces (APIs). Along the network 136, the switches, for example, can receive packets via a plurality of input ports and can transmit packets via a plurality of output ports. The processing nodes in the data center 100 can communicate with each other through the network 136 using a variety of networking paths established by the switches. Another example of the network 136 is a Wide Area Network (WAN).

A processing node (or node) is an addressable application running on a hardware device or virtual device that attaches to a network, and is capable of sending, receiving, or forwarding information over a communications channel to or from other processing nodes. Examples of electronic devices which can be deployed as hardware processing nodes include all varieties of computers, workstations, laptop computers, handheld computers, and smartphones. Processing nodes can be implemented in a cloud-based server system. More than one virtual device configured as a processing node can be implemented using a single physical device.

The data center 100 comprises a pool of reconfigurable dataflow resources. The pool of reconfigurable dataflow resources can have a variety of compute scales and hierarchies. The pool of reconfigurable dataflow resources can be a single processing node operatively coupled to a plurality of reconfigurable processors, which in turn is supported by different bus and memory resources. The processing node can have a host processor (e.g., a CPU) that exchanges data with the reconfigurable processors, for example, over a local bus like Peripheral Component Interconnect Express (PCIe) interface. The host processor can have a runtime processor (or a runtime logic) that manages resource allocation, memory corresponding, and execution of configuration files for applications requesting execution from the host processor.

The pool of reconfigurable dataflow resources can be a rack (or cluster) of processing nodes connected through the network 136. Each processing node in the rack can run a respective plurality of reconfigurable processors and include a respective host processor configured with a respective runtime processor. The runtime processors, distributed across the processing nodes, communicate with each other to provide unified access to reconfigurable processors attached not only to their own processing node but also to reconfigurable processors attached to every other processing node of the data center 100.

The pool of reconfigurable dataflow resources can be a pod that comprises a plurality of racks connected through the network 136. The pool of reconfigurable dataflow resources can be a superpod that comprises a plurality of pods connected through the network 136. The pool of reconfigurable dataflow resources can be a zone that comprises a plurality of superpods connected through the network 136. The pool of reconfigurable dataflow resources can be the data center 100 that comprises a plurality of zones connected through the network 136.

The pool of reconfigurable dataflow resources can include link (interconnect or transfer) and bus resources. Examples of the link resources include PCIe channels. Examples of bus resources include Direct Memory Access (DMA) channels, and Double Data Rate (DDR) channels. The pool of reconfigurable dataflow resources can include memory (or storage) resources. Examples of the memory resources include main memory (e.g., off-chip/external Random-Access Memory (RAM), Dynamic Random-Access Memory (DRAM), Static Random-Access Memory (SRAM), NAND flash), local secondary storage (e.g., local disks (e.g., Hard-Disk Drive (HDD), Solid-State Drive (SSD))), and remote secondary storage (e.g., distributed file systems, web servers). Other examples of the memory resources include latches, registers, flops, bypass networks, and caches (e.g., ones explicitly addressed by RAMs/DRAMs/SRAMs). The pool of reconfigurable dataflow resources is dynamically scalable to meet the performance requirements of applications requesting execution. The applications access the pool of reconfigurable dataflow resources over one or more networks (e.g., the Internet).

The discussion now returns to the first processing node of the data center 100. The first processing node comprises a host processor 102. Examples of the host processor 102 include x86 and x64 processors. The first host processor 102 interfaces with a host memory 150 (e.g., RAM). The first host processor 102 has a compiler 112 to compile applications and runtime logic 140 to execute the compiled applications on a plurality of reconfigurable processors (e.g., RPs 142). The runtime logic 140 is configured to provide on-demand access to the pool of reconfigurable dataflow resources, which can be rapidly provisioned and released with minimal management effort or service provider interaction.

Examples of the reconfigurable processors (e.g., RPs 142) include Field Programmable Gate Arrays (FPGAs), Coarse-Grained Reconfigurable Architectures (CGRAs), Application-Specific Integrated Circuits (ASICs), and Application Specific Instruction-set Processor (ASIP). The reconfigurable processors (e.g., RPs 142) interface with a reconfigurable processor memory 162 (e.g., DRAM). Each of the reconfigurable processors (e.g., RPs 142) includes an array of configurable units (e.g., compute units and memory units) in a programmable interconnect fabric. The array of configurable units in a reconfigurable processor is partitionable into a plurality of subarrays (or tiles) of configurable units. Additional details about one implementation of the architecture of the reconfigurable processors are discussed later in this application. In other implementations, the processing nodes in the data center 100 include processors instead of/in addition to the reconfigurable processors (e.g., RPs 142). Examples of such processors include Graphics Processing Units (GPUs) and Digital Signal Processors (DSPs). In other implementations, the first processing node does not comprise a host processor 102.

A Network Interface Controller 132 (e.g., NIC, SmartNIC) connects the first host processor 102 and the reconfigurable processors (e.g., RPs 142) to the Network Fabric 136 via a switching fabric 110. The Network Interface Controller 132 interfaces to the Network Fabric 136 via link 130. Examples of the network fabric links are Peripheral Component Interconnect Express (PCIe), Cache Coherent Interconnect for Accelerators (CCIX), Compute Express Link (CXL), Fibre Channel, Ethernet, InfiniBand, and Open Coherent Accelerator Processor Interface (OpenCAPI).

A Switching Fabric 110 (e.g. PEX) interfaces to the first host processor 102, the reconfigurable processors (e.g., RPs 142) and to the Network Interface Controller 132. The example Switching Fabric 110 uses eight point-to-point local links 120-127 operatively coupling to the reconfigurable processors (e.g., RPs 142), a ninth point-to-point link 128 operatively coupling to a first host processor 102 and a tenth point-to-point local link 129 to couple to the Network Interface Controller 132. In some implementations, the Switching Fabric 110 supports 16, 24, 32 or more links. The port count of a Switching Fabric 110 refers to the number of links it can support. So, an eight port Switching Fabric supports eight links. Examples of links are Peripheral Component Interconnect Express (PCIe), Cache Coherent Interconnect for Accelerators (CCIX), Compute Express Link (CXL), Fibre Channel, Ethernet, InfiniBand, and Open Coherent Accelerator Processor Interface (OpenCAPI). The Network Interface Controller 132 interfaces to the Network Fabric 136 via link 130.

The reconfigurable processors (e.g., RPs 142) topology comprises links providing an all-to-all linking via the Switching Fabric 110. Additional point-to-point links shown in FIG. 1 between reconfigurable processors (e.g., RPs 142)

do not require the bridging of a switching fabric 110. These links include cross coupling and direct linking between four reconfigurable processors. In some implementations, direct linking of reconfigurable processors does not require the bridging of a switching fabric 110. In some implementations, direct linking of reconfigurable processors is accomplished for five or more reconfigurable processors (e.g., RPs 142). In some implementations, a Dragonfly cluster technology implementation can provide point-to-point linking in an all-to-all topology for reconfigurable processors. In one implementation, a Fat Tree cluster implementation can be used. In other implementations, a 3D Torus cluster implementation can be used. In other implementations, a Hypercube or HyperX cluster technology can be implemented. One skilled in the art will appreciate that direct linking reconfigurable processors (e.g., RPs 142) is dependent on the reconfigurable processor pin count, printed circuit board (PCB) routing considerations, as well as cooling and power consumption to support a node in an all-to-all topology with direct links.

Having described the elements and interconnections of FIG. 1, the discussion now turns to determining link bandwidth and link latency for efficient streaming of data between processors on a same processing node and on different processing nodes and the sharing of links thereof.

Link Bandwidth and Link Latency

FIGS. 2A, 2B and 2C 200 compare target link bandwidths to rated link bandwidths of a first processing node in the data center of FIG. 1 using tables and a color-coded flattened representation of a plurality of reconfigurable processors (e.g., RPs 142). The processing elements RP0 242, RP1 243, RP2 244, and RP3 245 are reconfigurable processors in a first processing node.

Figures 2A, 2B, 2C:
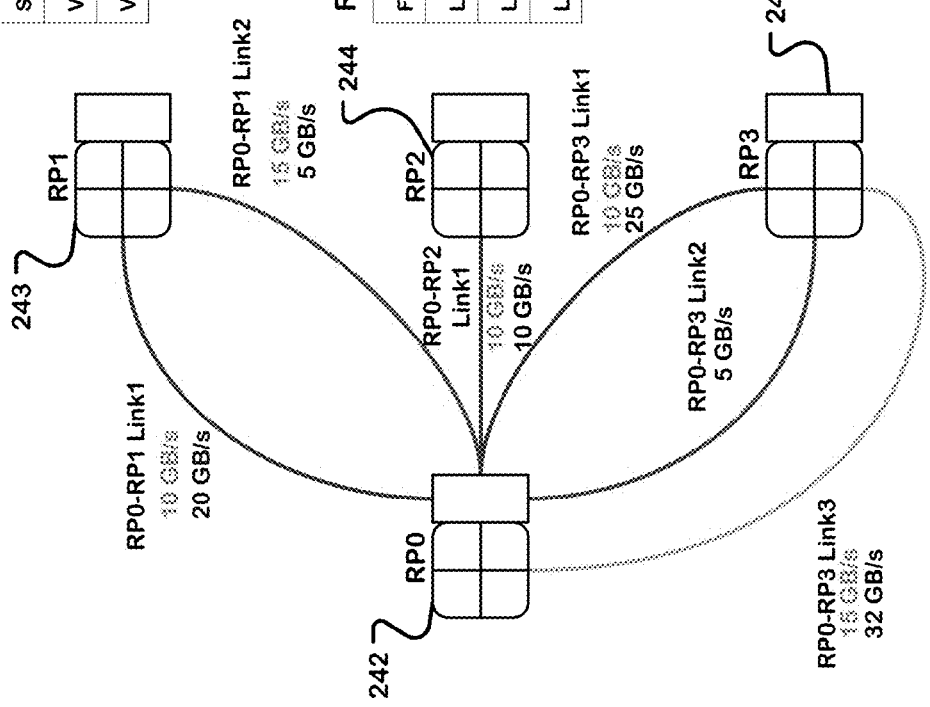
FIG. 2A shows an example specification table for target link bandwidths of a first processing node in the data center of FIG. 1.
FIG. 2B shows an example specification table for rated link bandwidths of a first processing node in the data center of FIG. 1.
FIG. 2C shows an example color-coded schematic comparing target link bandwidths to rated link bandwidths of a first processing node in the data center of FIG. 1.

FIG. 2A shows a table representing an example specification for target link bandwidths of a first processing node in the data center of FIG. 1. The table specifies two rows of virtual links listing target link bandwidths for pairs of virtual reconfigurable processors. The specification lists bandwidths for the three virtual pairs. The first virtual pair of reconfigurable processors corresponds to the pair RP0 242 to RP1 243. The second virtual pair corresponds to the pair RP0 242 to RP2 244 and the third virtual pair corresponds to the pair RP0 242 to RP3 245.

FIG. 2B shows a table representing an example specification for rated link bandwidths of a first processing node in the data center of FIG. 1. The rated link bandwidths table has three rows of rated links available for the three virtual pairs. The three rows of rated links do not provide bandwidth to every virtual pair. Link 2 is not available for the second virtual pair corresponding to RP0 242 to RP2 244. Link3 is not available for the two pairs RP0 242 to RP1 243 and RP0 242 to RP2 244. Only RP0 242 to RP3 245 has three rated links available.

FIG. 2C shows an example color-coded flattened schematic comparing target link bandwidths to rated link bandwidths for the processing elements RP0 242, RP1 243, RP2 244, and RP3 245 which are four reconfigurable processors (e.g., RPs 142) of a first processing node in the data center of FIG. 1. A graphical comparison of target link bandwidths to rated link bandwidths has color coding. The rated link bandwidth is in black font and the target link bandwidth is in orange font. For example, the RP0-RP1 Link2 with a rated link bandwidth of 5 GB/s in the black font is less than the virtual specification of 15 GB/s in orange. Therefore, since the RP0-RP1 Link2 does not meet the virtual specification, the line drawn between RP0 242 to RP1 243 is in the color red. The first virtual pair corresponds to the pair RP0 242 to RP1 243. The second virtual pair corresponds to the pair RP0 242 to RP2 244, and the third virtual pair corresponds to the pair RP0 242 to RP3 245. For the first virtual pair, only the RP0-RP1 Link1 whose line is in blue satisfies the virtual request of the first processing node. For the second virtual pair, only the PR0-PR2 Link1 meets the requirements of Virtual Link2 and is color-coded blue. The third virtual pair meets all the virtual specifications. The best link is in the green color for RP0 242 to RP3 245, where the rated Link3 corresponds to the Virtual Link1 and the rated Link1 in the color blue corresponds to Virtual Link2.

A bandwidth equation summarizes the requirements to meet when running applications concurrently over shared links between RPs i and j:

$$BWk(ij) > BWk(a)(ij) + BWk(b)(ij)$$

Where:
  BWk (ij)—Total bandwidth between nodes i and j through path k
  BWk(a)(ij)—Bandwidth requirement from a first application (a) between nodes i and j
  BWk(b)(ij)—Bandwidth requirement from a second application (b) between nodes i and j
  If a third application BWk(c)(ij) is presented, the Kernel Resource Manager (KRM) checks each set of links k between the two nodes (i, j) that satisfy:
  BWk (ij)>[BWk(a)(ij)+BWk(b)(ij)+BWk(c)(ij)] with the most optimum routing.

In some implementations, the rated link bandwidths are rated based on a hardware configuration of the links. In some implementations, the hardware configuration is a data transfer rate of the link. In some implementations, the hardware configuration is a link width of the links. An example of PCIe v5.0 link bandwidth is 32 GB/s for each lane/way. A 4 lane/way PCIe v5.0 implementation would supply a total bandwidth of 128 GB/s. An example of PCIe v6.0 link bandwidth is 64 GB/s for each lane/way. A 4 lane/way PCIe v6.0 implementation would supply a total bandwidth of 256 GB/s. An example InfiniBand link bandwidth for a 12-way HDR implementation is 600 GB/s. The InfiniBand Trade Association (IBTA) roadmap shows future InfiniBand link bandwidths increasing to NDR having 1.2 TB/s, XDR having 2.4 TB/s, and GDR having 4.8 TB/s.

Having described the aspect of comparing bandwidths, the discussion now turns to choosing link latency for efficiently streaming of data concurrently for a first and for a second application over shared links by allocating link latency for the first and second applications between processors on an intra or inter processing node.

Figure 3:
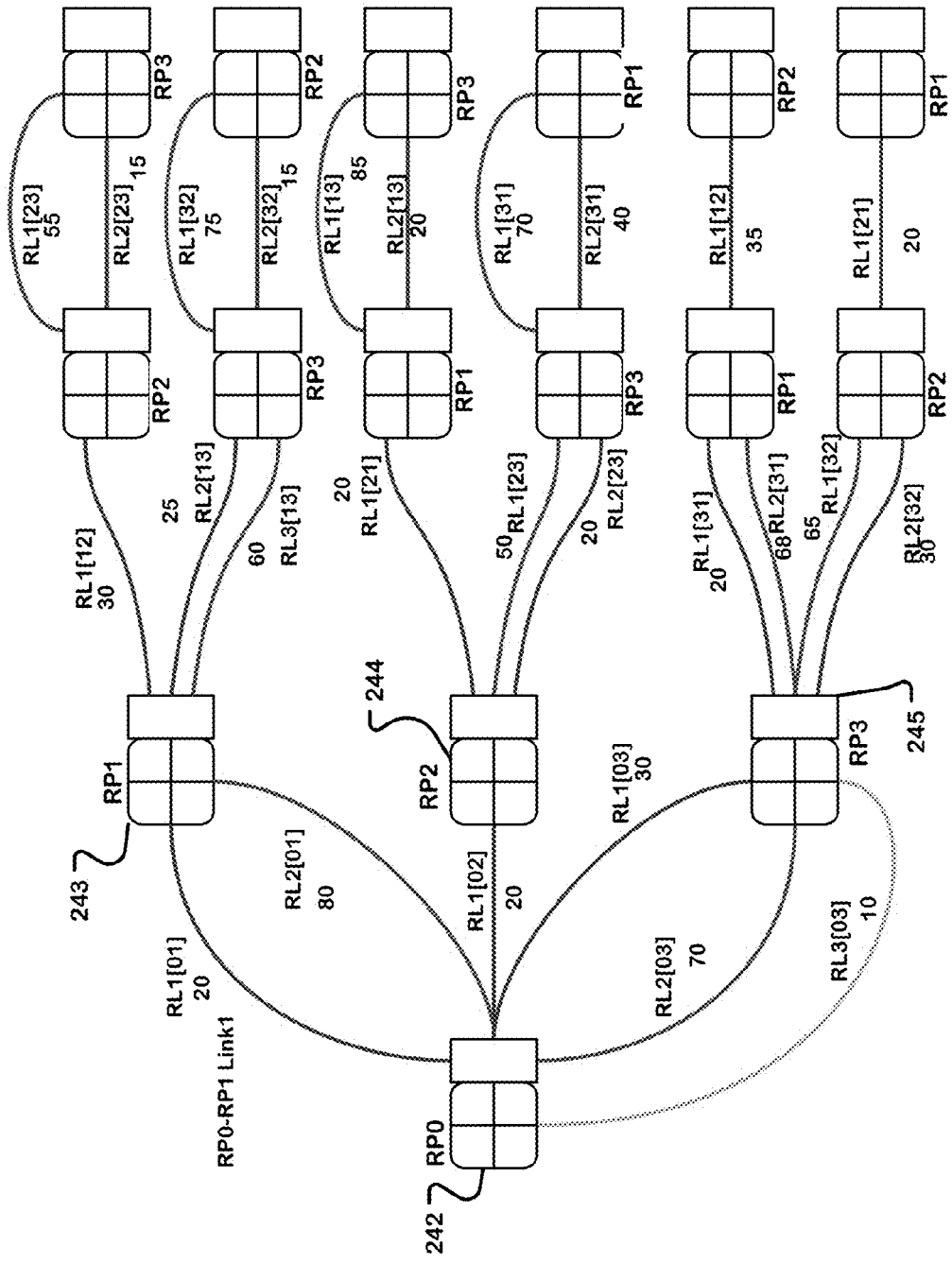
FIG. 3 shows an example runtime logic assignment of rated link latencies in a color-coded schematic as normalized scores from one to one hundred for a first processing node in the data center.

FIG. 3 shows an example compiler assignment 300 of rated link latencies in a color-coded schematic as normalized scores from one to one hundred for a first processing node in the data center of FIG. 1. The runtime assignment of Rated Link (RL) latency is a normalized score from one to one hundred and assigned to every link. For example, the link RP0 242 to RP1 243 is corresponding to RL1[01] with a normalized score of 20. This figure illustrates all combinations to help identify the shortest path from the perspective of RP0 242. Calculating rated link latency is not only from the first reconfigurable processor (e.g., RP0), but calculates from all the reconfigurable processors in each node creating many permutation tables from RP1's perspective, RP2's perspective, RP3's perspective, etc. The Kernel Resource Manager (KRM) manages links in order to meet latency and bandwidth specifications when allocating reconfigurable processors to reconfigurable processor pairs from the data resource pool. When an application specifies virtual resources for matching computational and memory requirements, the KRM identifies links connecting and allocating data resources by comparing the latency costs.

FIGS. 4A, 4B and 4C 400 depict in table format and graphically target link latency and routing table links as normalized scores.

Figures 4A, 4B, 4C:
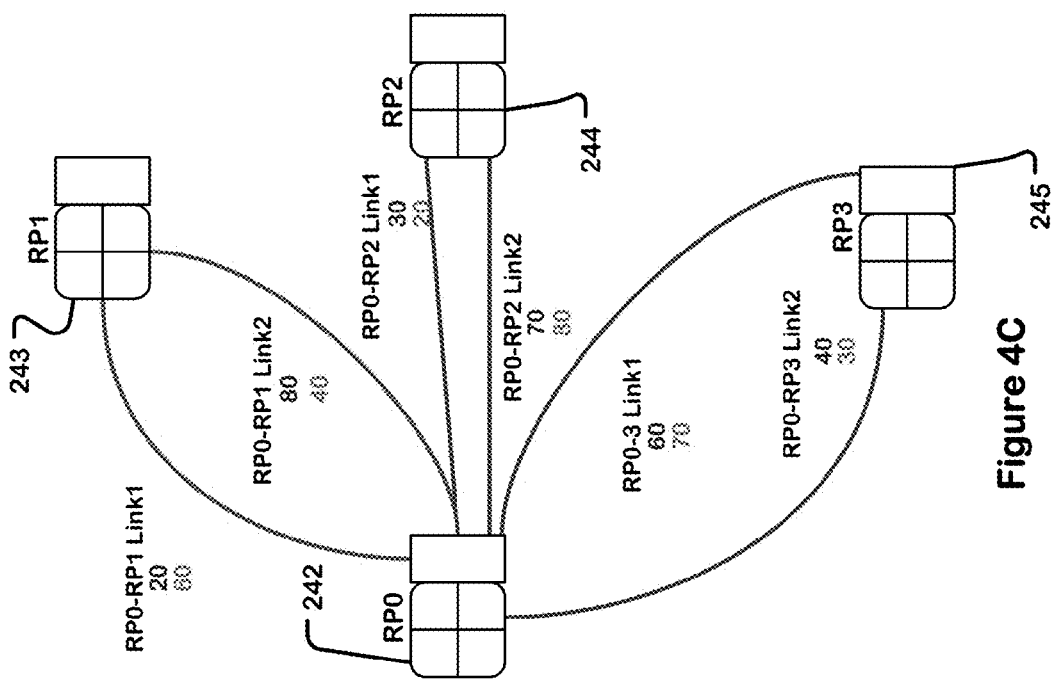
FIG. 4A shows an example table representing a first specification for target link latency as normalized scores of a first processing node in the data center of FIG. 1.
FIG. 4B shows an example table representing a resource allocator routing table of rated links numbered as normalized scores for a first processing node in the data center of FIG. 1.
FIG. 4C shows an example color-coded schematic comparing virtual pairs for matching the normalized scores of target link latency to resource allocator routing table normalized scores of rated links latency in a first processing node in the data center of FIG. 1.

FIG. 4A shows an example table representing a first specification for target link latency as normalized scores of a first processing node in the data center of FIG. 1. The table specifies two rows of virtual links listing target link latency for virtual pairs of reconfigurable processors. The specification lists normalized scores for the three virtual pairs. The first virtual pair corresponds to the pair RP0 242 to RP1 243. The second virtual pair corresponds to the pair RP0 242 to RP2 244 and the third virtual pair corresponds to the pair RP0 242 to RP3 245.

FIG. 4B shows an example table representing a resource allocator routing table numbered as normalized scores for a first processing node in the data center of FIG. 1. The table specifies two rows of (physical) links listing rated latency for pairs of reconfigurable processors. The routing table lists normalized scores for the three pairs where the first pair corresponds to the pair RP0 242 to RP1 243, the second pair is the pair RP0 242 to RP2 244 and the third pair is the pair RP0 242 to RP3 245.

FIG. 4C shows an example color-coded schematic comparing link bandwidths and link latencies for matching the normalized scores of target link latency to resource allocator routing table's normalized scores of rated link latency in a first processing node in the data center of FIG. 1. The target latency is in a blue font and the routing table normalized value is in green font. For example, the link between RP0 242 and RP1 243, named RP0-RP1 Link1, shows the target link latency 1 value of 20 taken from FIG. 4A is in blue. The rated link 1 with a normalized value of 60 in green is taken from FIG. 4B. Likewise, the link between RP0 242 and RP1 243 named RP0-RP1 Link2 shows a target link latency of 80 in blue from the table in FIG. 4A, and a rated link latency of 40 in green from the routing table in FIG. 4B. Since these values do not route in the most optimum way, matching the normalized score with the least latency to the link with the highest latency target, the lines are both shown in red color. The links shown in blue represent an optimal routing where the normalized scores match relatively closely. For example, the default routing between RP0 242 and RP3 245 is the link RP0-RP3 Link2 with a value 40 in blue for target link latency and a value of 30 in green from the routing table of FIG. 4B. This example shows the default matching of the lower rated latency in the routing table to the lower target link latency. The next figure shows allocation corrections to default values between RP0 242 and RP1 243.

FIGS. 5A, 5B and 5C 500 depict in table format and graphically target link latency and a revised routing table of normalized scores.

FIG. 5A shows a table representing a first specification for target link latency as normalized scores for a first processing node in the data center of FIG. 1. The table specifies two rows of virtual links listing target link latency for virtual pairs of reconfigurable processors. The specification lists normalized scores for the three virtual pairs. The first virtual pair corresponds to the pair RP0 242 to RP1 243. The second virtual pair corresponds to the pair RP0 242 to RP2 244 and the third virtual pair corresponds to the pair RP0 242 to RP3 245.

FIG. 5B shows a table representing a revised resource allocator routing table of normalized scores for a first processing node in the data center of FIG. 1. Continuing with the same color coding as shown in FIG. 4C, the normalized values of target link latency are in a blue font and the routing table's normalized values are in a green font. To correct the routing problem disclosed in FIG. 4C, of two links between RP0 242 and RP1 243, RP0-RP1 Link1 swaps with RP0-RP1 Link2. Referring to the original target link latency of FIG. 4A where the target link latency 1 is a normalized value of 20 and the target link latency 2 has a value 80. Now, after swapping, FIG. 5A shows the target link latency 20 is matched to RP0-RP1 Link2 which has a rated link latency 40, while the target link latency 80 is allocated with RP0-RP1 Link1 having a rated link latency 60.

FIG. 5C shows a color-coded schematic according to a revised resource allocator routing table of normalized scores for a first processing node in the data center of FIG. 1. All links are now in blue after allocation corrections to the two RP0-RP1 links.

FIGS. 6A, 6B and 6C 600 depict in table format and graphically a second set of target link latencies and routing table links as normalized scores.

Figures 6A, 6B, 6C:
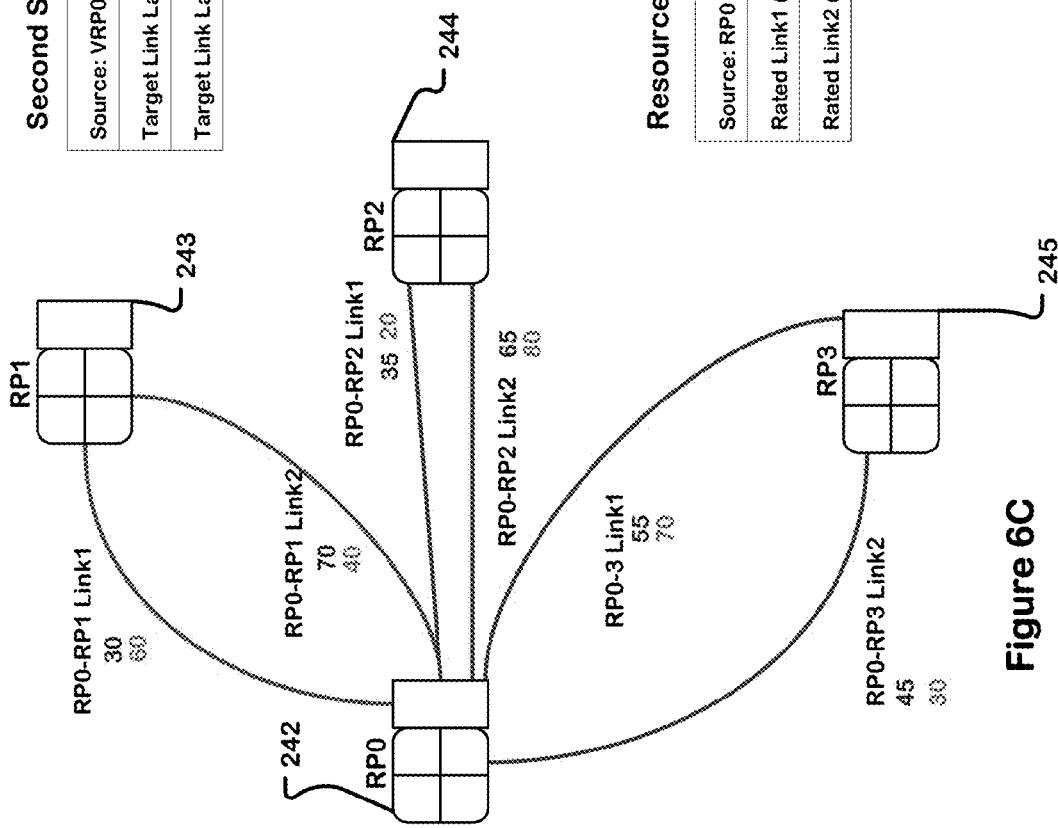
FIG. 6A shows an example table representing a second specification for a target link latency numbered as normalized scores for a first processing node in the data center.
FIG. 6B, same as FIG. 4B, shows an example table representing a resource allocator routing table of rated links numbered as normalized scores for a first processing node.
FIG. 6C shows an example color-coded schematic comparing virtual pairs for matching the second specification's target link latency as normalized scores to resource allocator routing table's rated links latency as normalized scores for a first processing node.

FIG. 6A shows a table representing a second specification for target link latency as normalized scores for a first processing node in the data center of FIG. 1. The table specifies two rows listing target link latency for virtual pairs of reconfigurable processors. There are three columns listing the virtual pairs, a first column VRP0 to VRP1, a second column VRP0 to VRP2, and a third VRP0 to VRP3. The specification lists normalized scores for the three virtual pairs. The first virtual pair corresponds to the pair RP0 242 to RP1 243. The second virtual pair corresponds to the pair RP0 242 to RP2 244 and the third virtual pair corresponds to the pair RP0 242 to RP3 245.

FIG. 6B, which is FIG. 4B repeated in 600 and renamed FIG. 6B, shows a table representing a resource allocator routing table of normalized scores of a first processing node in the data center of FIG. 1. The table specifies two rows of (physical) links listing rated latency scores: rated link1 score and rated link2 score. The routing table lists normalized scores for the three pairs of reconfigurable processors. The first pair corresponds to the pair RP0 242 to RP1 243. The second pair corresponds to the pair RP0 242 to RP2 244 and the third pair corresponds to the pair RP0 242 to RP3 245.

FIG. 6C shows an example color-coded schematic comparing virtual pairs for matching the normalized scores of target link latency to resource allocator routing table normalized scores of rated latency in a first processing node in the data center of FIG. 1. The target latency is in a blue font and the routing table normalized value is in green. For example, the link between RP0 242 and RP1 243 is named RP0-RP1 Link1 and shows the target link latency 1 value of 30 in blue from FIG. 6A. The rated link latency 1 with a value of 60 in FIG. 6B is shown in green. Likewise, another link between RP0 242 and RP1 243 is named RP0-RP1 Link2 and shows a target link latency of 70 in blue taken from the specification in FIG. 6A. The RP0-RP1 Link2 shows a rated link latency of 40 in green taken from the routing table in FIG. 6B. Since these values do not route in the most optimum way, matching the link with least rated latency of normalized score to the virtual link with the highest latency target, the lines are both shown in RED. The links shown in blue represent an optimal routing where the normalized scores match relatively closely. For example, the default routing between RP0 242 and RP3 245 is the link RP0-RP3 Link2 with a rated latency value 30 in green from the routing table of FIG. 6B allocated for the target link latency value 45 in blue. This example shows the default matching of the lower target link latency to the lower link latency in the routing table.

One skilled in the art will appreciate that values in the specification of FIG. 6A and values in the table of FIG. 6B are copied into FIG. 6C using the color codes of blue and green. The next FIG. 700 shows allocations and corrections to default values of the link between RP0 242 and RP1 243.

FIG. 7B shows a table representing a revised resource allocator routing table of normalized scores for a first processing node in the data center of FIG. 1. Continuing with the same color coding as shown in FIG. 4C, the target latency normalized values are in a blue font and the routing table normalized values of FIG. 7B are in a green font. To correct the routing problem disclosed in FIG. 6C, the link RP0 242 to RP1 243 named RP0-RP1 Link1 swaps with RP0-RP1 Link2 for the original target link latency 1 of FIG. 7A, where the original target link latency 1 is a normalized value of 30 and the original target link latency 2 is a value of 70.

FIG. 7C shows a color-coded schematic according to a revised resource allocator routing table matching the normalized scores of target link latency to the normalized scores of the routing table for a first processing node in the data center of FIG. 1. Now, as seen in the FIG. 7C, the virtual link of target latency 30 is matched to RP0-RP1 Link2 with a rated value of 40, and target link latency of 70 is allocated with RP0-RP1 Link1 having a rated latency value of 60. All links are now in blue after allocation corrections to the two RP0-RP1 links.

The concept of counting hops as a factor in latency calculations is disclosed in the following FIGS. 8A, 8B, 8C, and 8D. The normalized scores include calculations of the required hops and bandwidths available. Some switches incur 100 nanosecond delays to traverse. Tables listing delay values for various network elements are tabulated according to the hop counts and specific device delays. The hop counts shown are only between reconfigurable processors. It does not include hop counts incurred by host processors.

Figure 8A:
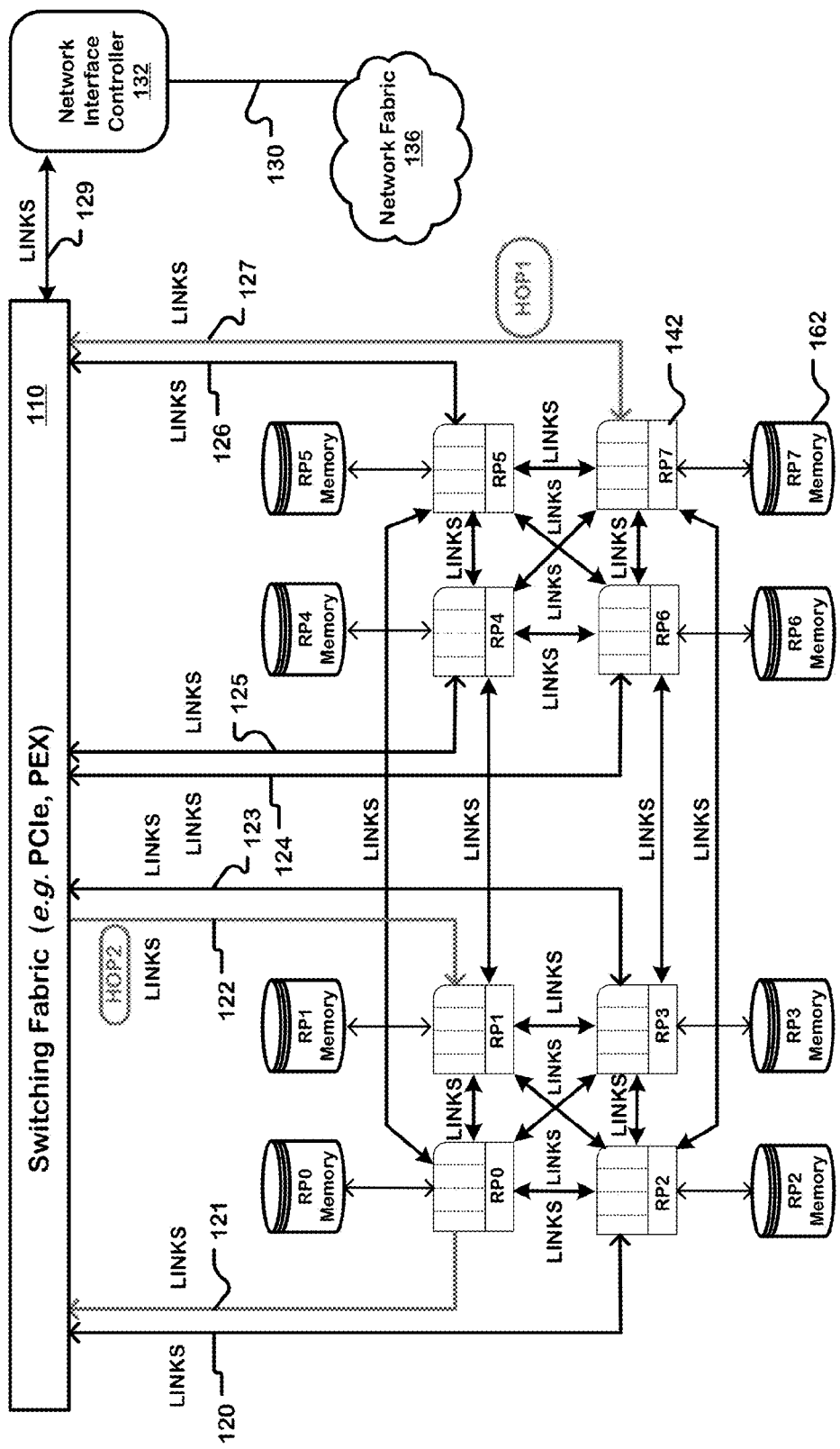
FIG. 8A shows a first example schematic for calculating rated link latencies based on two hops between two reconfigurable processors in the plurality of reconfigurable processors in an intra-node implementation.

FIG. 8A shows a first example schematic for calculating rated link latencies based on two hops between two reconfigurable processors in the plurality of reconfigurable processors for an intra-node implementation. A first hop is from the reconfigurable processor RP0 to RP7 via the link 121 through the switching fabric 110 to link 127. A second hop is from RP7 to RP1 via link 127 through the switching fabric 110 to link 122. The links are in green color.

Figure 8B:
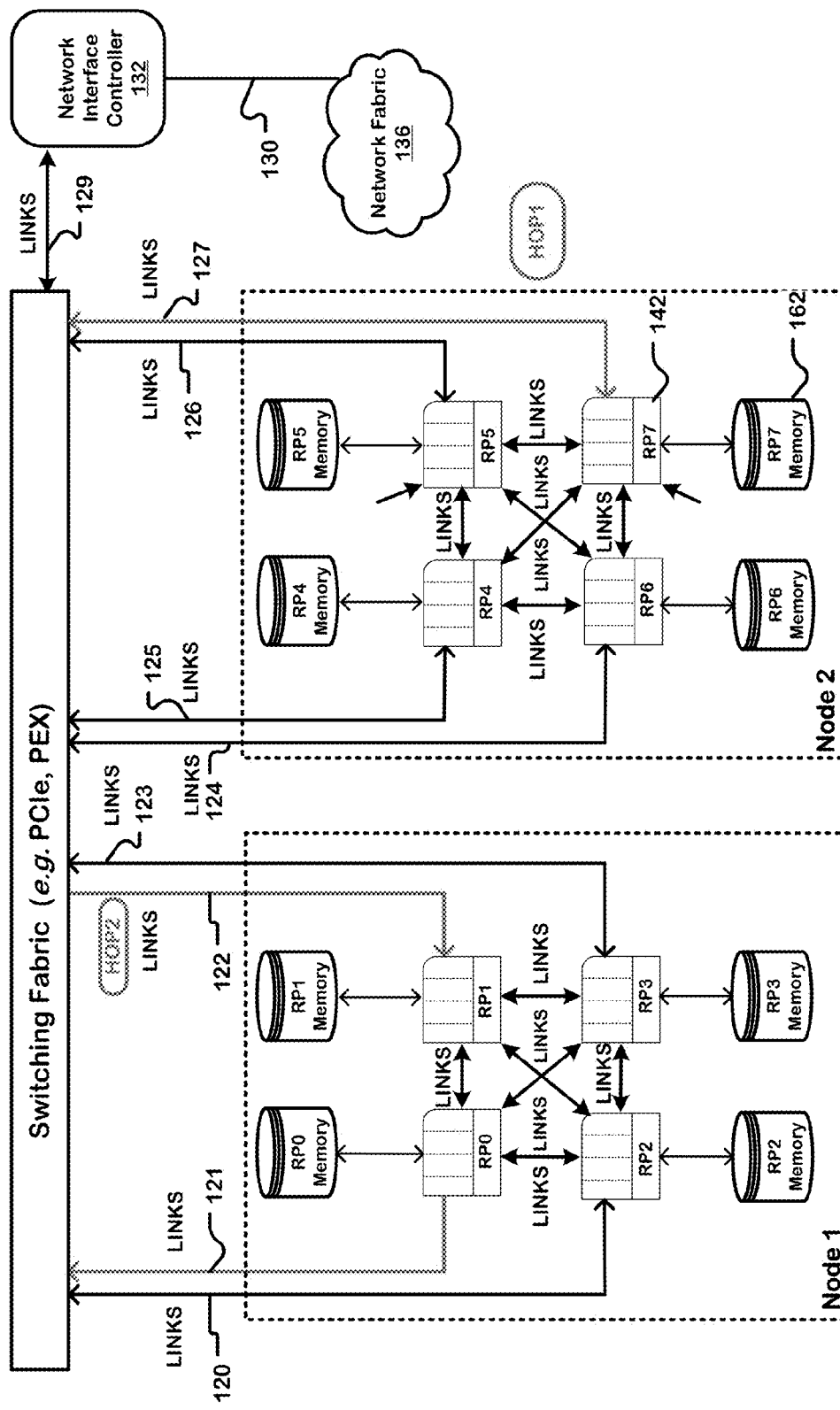
FIG. 8B shows a second example schematic for calculating rated link latencies based on two hops between two reconfigurable processors in the plurality of reconfigurable processors for an in an inter-node implementation.

FIG. 8B shows a second example schematic for calculating rated link latencies based on two hops between two reconfigurable processors in the plurality of reconfigurable processors for an inter-node implementation. A first hop is from the reconfigurable processor RP0 of Node 1 connecting to RP7 in Node 2 via the link 121 through the switching fabric 110 to link 127. A second hop is the connection of RP7 in Node 2 to RP1 in Node 1 via link 127 through the switching fabric 110 to link 122. In some implementations the switching fabric can support one node, two nodes, three nodes, four nodes or more nodes.

Figure 8C:
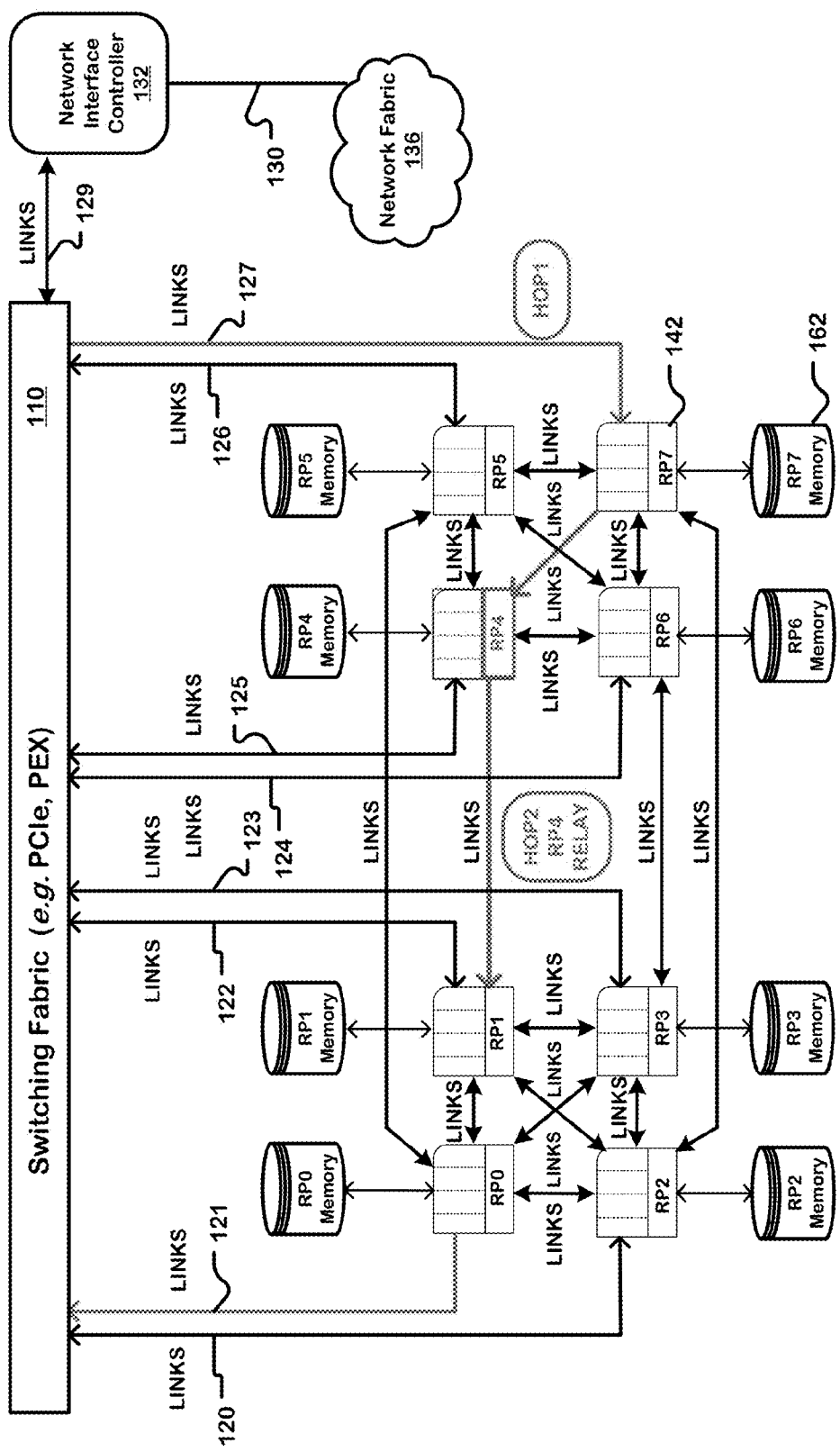
FIG. 8C shows a third example schematic for calculating rated link latencies based on two hops between two reconfigurable processors in the plurality of reconfigurable processors in an intra-node implementation.

FIG. 8C shows a third example schematic for calculating rated link latencies based on two hops between two reconfigurable processors in the plurality of reconfigurable processors in an intra-node implementation, where a hop is an intermediate reconfigurable processor between the two reconfigurable processors. In some implementations, the reconfigurable processor RP4 is operative as a relay in a unidirectional direction. In some implementations, the reconfigurable processor RP4 is operative as a relay in a bi-directional direction. In some implementations, the reconfigurable processor RP4 is operative with an a priori static delay for calculating the normalized latency scores. In some implementations, the reconfigurable processor RP4 is operative with a dynamic delay based on configuration files and routing when calculated for the normalized latency scores.

Figure 8D:
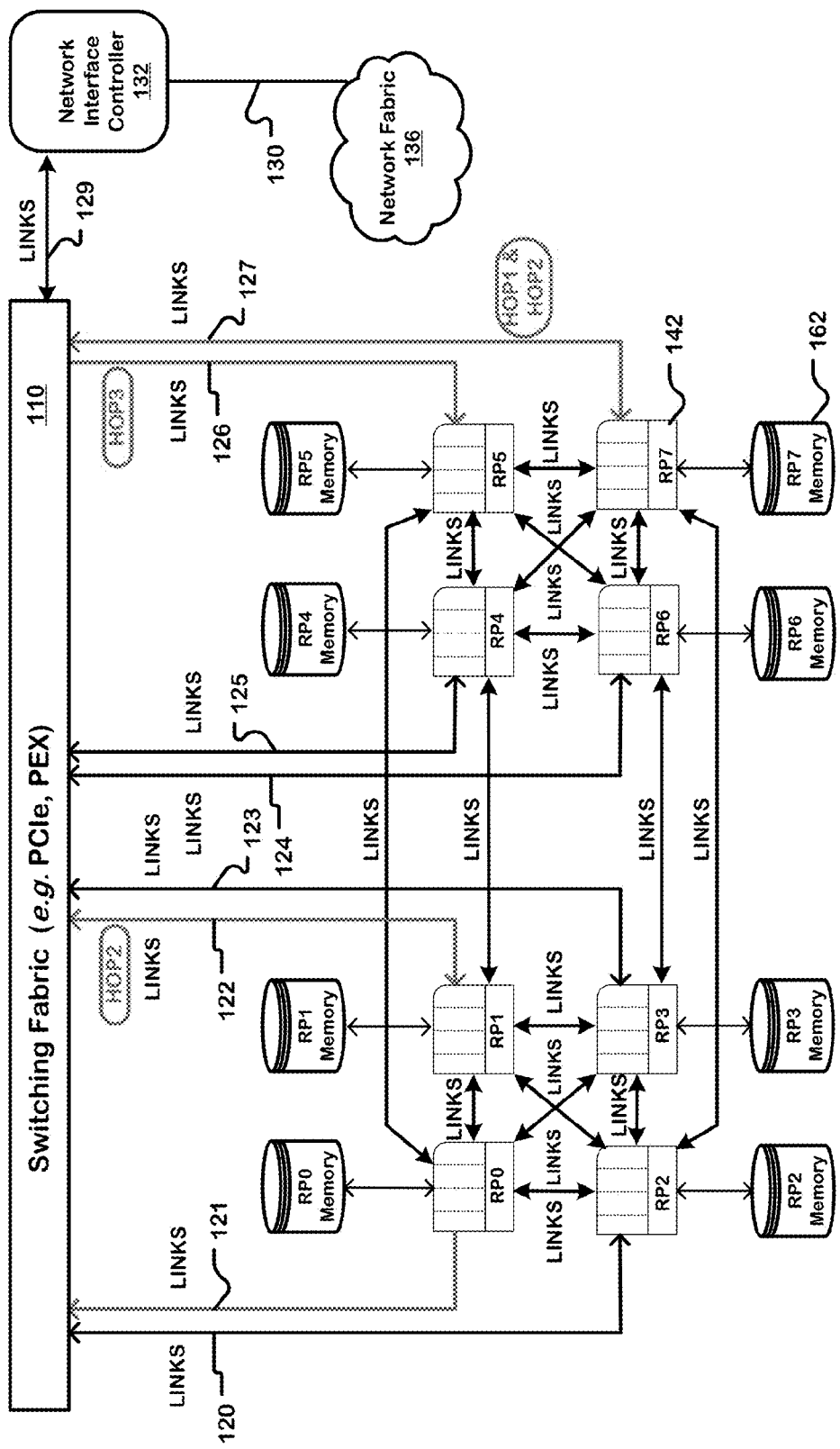
FIG. 8D shows a fourth example schematic for calculating rated link latencies based on three hops between two reconfigurable processors in the plurality of reconfigurable processors in an intra-node implementation.

FIG. 8D shows a fourth example schematic for calculating rated link latencies based on three hops between two reconfigurable processors in the plurality of reconfigurable processors in, for example, an intra-node implementation. A first hop is from the reconfigurable processor RP0 to RP7 via the link 121 through the switching fabric 110 to link 127. A second hop is from RP7 to RP1 via link 127 through the switching fabric 110 to link 122. A third hop is from the reconfigurable processor RP1 to RP5 via the link 122 through the switching fabric 110 to link 126. The links are in green color.

One skilled in the art will appreciate that the number of hops counted for the latency normalization score is architecture dependent based on the permutations of traversing links, traversing a plurality of switching fabrics, reconfigurable processor relays, switches, routers, and bandwidth available. In some implementations, some links can be faster because of internal routing of the reconfigurable processors. The Kernel Resource Manager searches out the fastest links according to a knapsack or greedy algorithm, meeting the application specifications' input to the compiler. In some implementations, an Open Shortest Path First (OSPF) is a routing protocol for Internet Protocol (IP) networks. It uses a Link State Routing (LSR) algorithm that falls into the group of Interior Gateway Protocols (IGPs), operating within a single Autonomous System (AS) and defined as OSPF Version 2 in RFC 2328 (1998) for IPv4.

Having described allocating link latency for first and second applications running concurrently over the same links for efficient streaming of data between processors on a same processing node and on different processing nodes and the sharing of links thereof, the discussion now turns to the aspects of compiling an application and the generation of execution files disclosed by the technology disclosed.

Compiling Applications and Generating Execution Files

Figure 9:
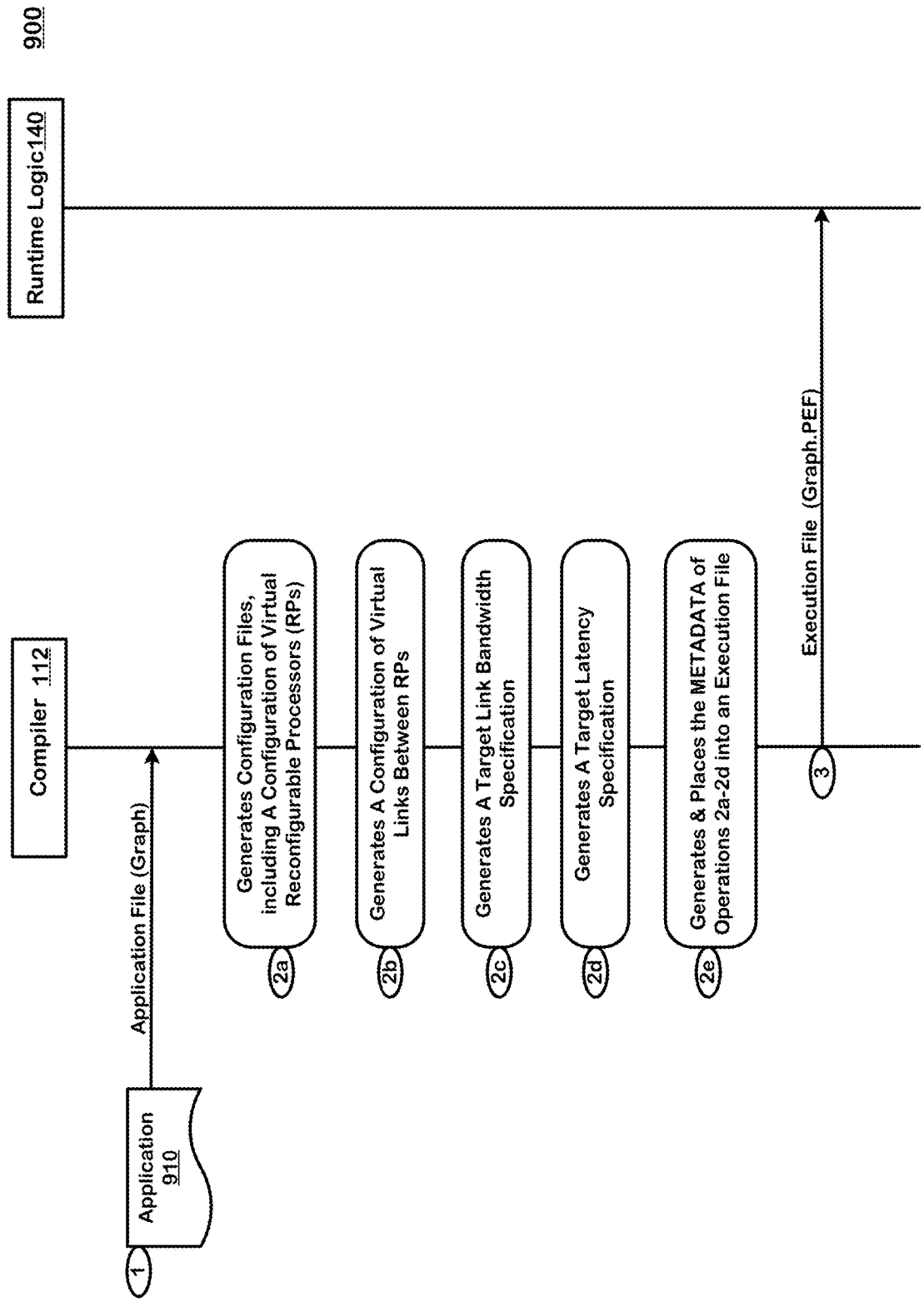
FIG. 9 is a message sequence chart illustrating one implementation of compiling an application and generating an execution file for reconfigurable processors based on link bandwidth and link latency.

FIG. 9 is a message sequence chart 900 showing the loading of an application 910 into a compiler 112 and the generation of configuration files. The runtime logic 140 also comprises allocation logic, as explained supra. The compiler 112 compiles an application 910 to generate a graph that includes one or more configuration files corresponding to the application 910. The runtime logic 140 receives an application 910 and execute one or more configuration files by sending a Graph.PEF (PEF stands for "pattern execution file") to one or more of the reconfigurable processors (e.g., RPs 142). The reconfigurable processors (e.g., RPs 142) process the configuration files and send the generated outputs to the first host processor 102 using at least one of the reconfigurable processors-to-host processors. In some implementations, the node does not require or comprise a host processor.

At operation one, the application 910 sends an application file, also referred to as a graph, to a compiler 112. A series of compiler operations will generate an execution file and a plurality of configuration files. A compiler 112 compiles application(s) 910 and generates configuration files. The configuration files specify virtual dataflow resources required to execute the application graph.

At operation 2a, the compiler 112 generates configuration files, including a configuration of virtual reconfigurable processors (RPs). At operation 2b, the compiler generates a configuration of virtual links between RPs. At operation 2c, the compiler generates a target link bandwidth specification. At operation 2d, the compiler generates a target latency specification. At operation 2E, the compiler generates and places the metadata of operations 2a-2d into an execution file. At operation three, the compiler sends the execution file (Graph.PEF) to the runtime logic 140 for execution on a first processing node in the data center of FIG. 1. Other implementations may perform the operations in different orders and/or with different, fewer, or additional operations than the ones illustrated in FIG. 9. Multiple operations can be combined in some implementations. One skilled in the art will appreciate that, in FIG. 9, operations three can comprise streaming network packets between reconfigurable processors (e.g., RPs 142) and a host processor (e.g., host 102) on a same processing node over local links (e.g., PCIe links) using a protocol like Transmission Control Protocol (TCP).

Loading and Executing Applications

Figure 10:
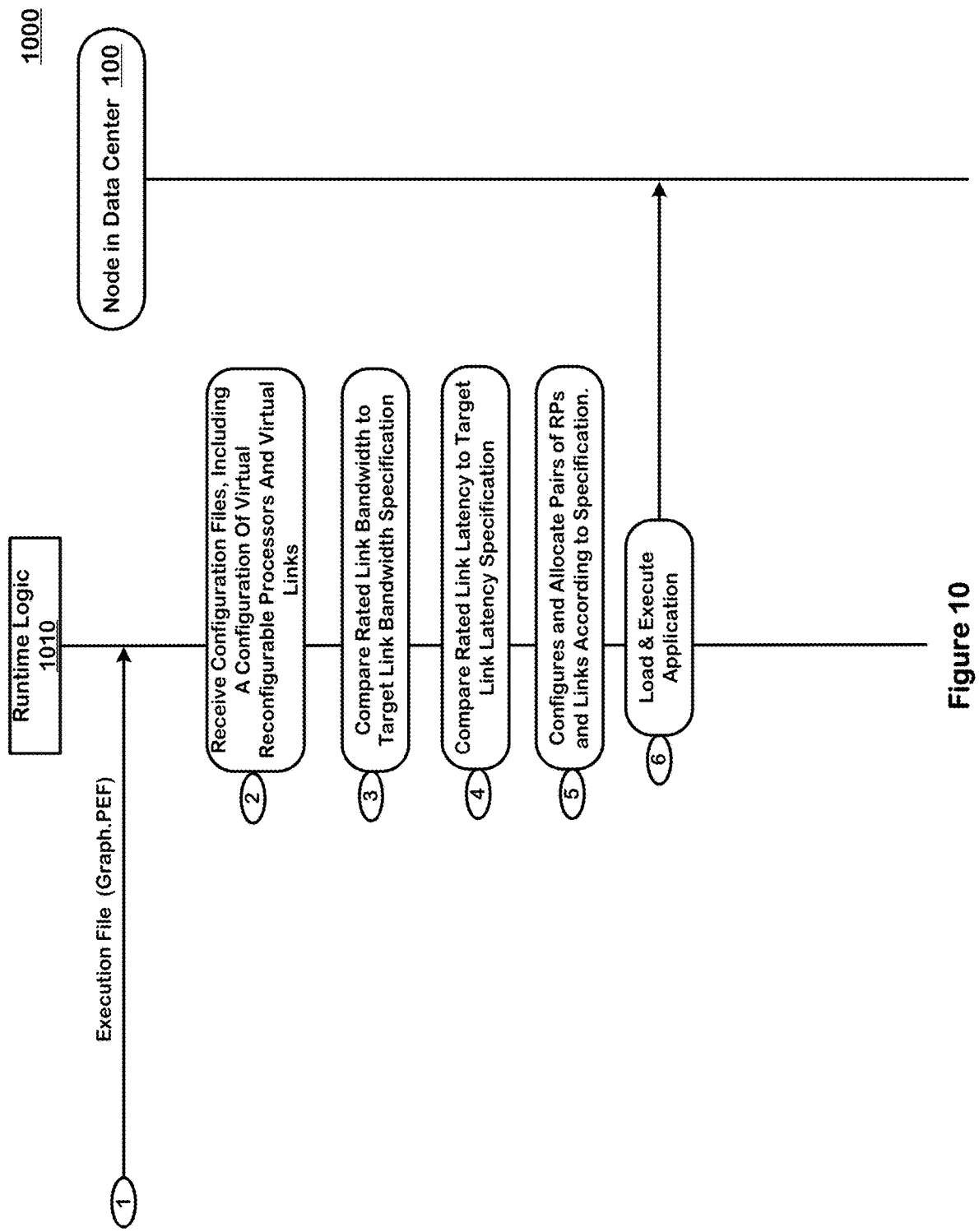
FIG. 10 is a message sequence chart illustrating one implementation of a data processing system executing an application using the disclosed resource allocation for reconfigurable processors based on link bandwidth and link latency.

FIG. 10 is a message sequence chart 1000 illustrating one implementation of a data processing system executing an application using the disclosed resource allocation for reconfigurable processors based on link bandwidth and link latency. A runtime logic 1010 compares target link latency and target link bandwidth specifications to rated link latency and rated link bandwidth values. Based on target specifications meeting rated values, the system allocates dataflow resources. The runtime logic 1010 allocates pairs of reconfigurable processors and corresponding links for generating the configuration files used to load and execute an application.

At operation one, runtime logic 1010 receives an execution file comprising configuration files that define an application. At operation two, configuration files, including the configuration of virtual reconfigurable processors and virtual links defining the application, is processed by the runtime logic 1010. At operation three, the runtime logic 1010 compares the rated link bandwidth to target link bandwidth of the virtual links defined by the specification. At operation four, the runtime logic 1010 compares the rated link latency to target link latency of the virtual links specification. At operation five, the runtime logic 1010 configures and allocates pairs of reconfigurable processors and links according to the specification. At operation six, the runtime logic 1010 loads reconfigurable processors (e.g., RPs 142) with configuration files and executes the application using the configured pairs of reconfigurable processors and the configured links on a first processing node in the data center of FIG. 1.

In some implementations, the operations three and four are reversed with the comparison of link latency preceding the comparison of link bandwidth. Other implementations may perform the operations in different orders and/or with different, fewer, or additional operations than the ones illustrated in FIG. 10. Multiple operations can be combined in some implementations. One skilled in the art will appreciate that, in FIG. 10, operation six comprises streaming network packets between reconfigurable processors (e.g., RPs 142) and a host processor (e.g., host 102) on a same processing node over local links (e.g., PCIe links) using a protocol like Transmission Control Protocol (TCP). In some implementations, operation six can apply to application graphs which are executed in parallel and/or across different processing nodes.

Figure 11:
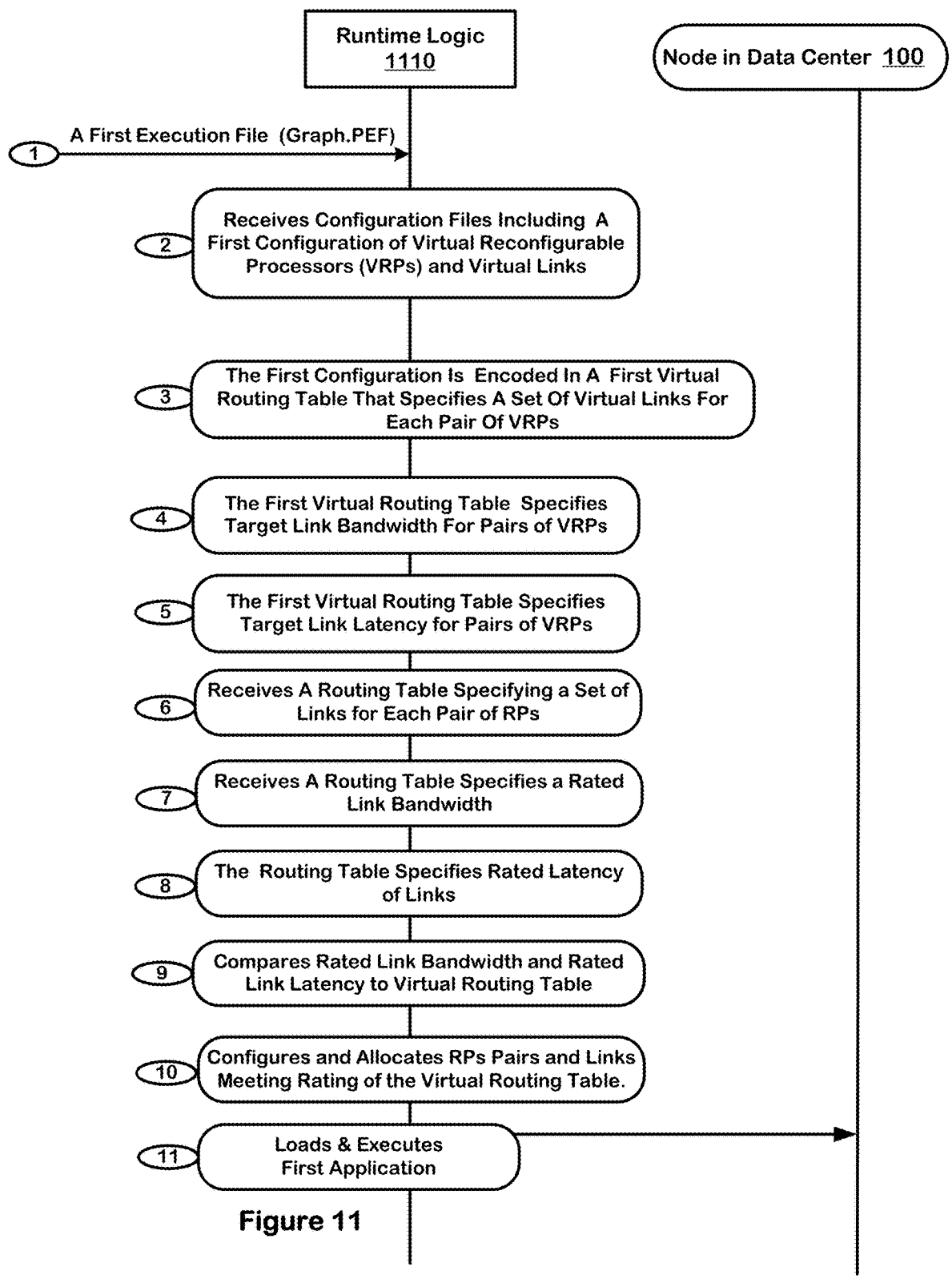
FIG. 11 is a message sequence chart illustrating one implementation of a data processing system executing a first application using the disclosed resource allocation for reconfigurable processors based on link bandwidth and link latency.

FIG. 11 is a message sequence chart 1100 illustrating one implementation of a data processing system executing a first application using the disclosed resource allocation for reconfigurable processors based on link bandwidth and link latency. A runtime logic 1110 compares a target link latency and target link bandwidth specification to rated link latency and rated link bandwidth values. Based on rated system dataflow resources available to meet target specifications, the runtime logic 1110 allocates pairs of reconfigurable processors and corresponding links for generating the configuration files used to load and execute an application.

At operation one, an execution file comprising configuration files that define an application is received by the runtime logic 1110. At operation two, the specification defining the application is processed by the runtime logic 1110, where the execution file provides a first configuration of virtual reconfigurable processors and virtual links. At operation three, the runtime logic 1110 processes the first configuration encoded in a first virtual routing table that specifies a set of virtual links for each pair of virtual reconfigurable processors in the first plurality of virtual reconfigurable processors. At operation four, the first specification is encoded in the first virtual routing table that specifies a target link bandwidth for each virtual link in the set of virtual links. At operation five, the first specification is encoded in the first virtual routing table that specifies a target link latency of each virtual link in the set of virtual links. At operation six, the runtime logic 1110 is further configured to receive, for the first application, a routing table that specifies a set of links for each pair of reconfigurable processors in the plurality of reconfigurable processors available to execute the first application. At operation seven, the routing table specifies a rated link bandwidth of each link in the set of links. At operation eight, the routing table specifies a rated link latency of each link in the set of links. At operation nine, the runtime logic 1110 compares the rated link bandwidth to target link bandwidth of the virtual links defined by the specification. At operation ten, the runtime logic 1110 configures the allocated pairs of reconfigurable processors and the allocated links with the configuration data in the first configuration files. At operation eleven, the runtime logic 1110 loads and executes the first application using the configured pairs of reconfigurable processors and the configured links on a first processing node in the data center of FIG. 1.

In some implementations, the specification is included in metadata header files. In some implementations, the operations seven and eight are reversed with operation eight preceding operation seven. Other implementations may perform the operations in different orders and/or with different, fewer, or additional operations than the ones illustrated in FIG. 11. Multiple operations can be combined in some implementations. One skilled in the art will appreciate that, in FIG. 11, operation eleven comprise streaming network packets between reconfigurable processors (e.g., RPs 142) and a host processor (e.g., host 102) on a same processing node over local links (e.g., PCIe links) using a protocol like Transmission Control Protocol (TCP).

Figure 12:
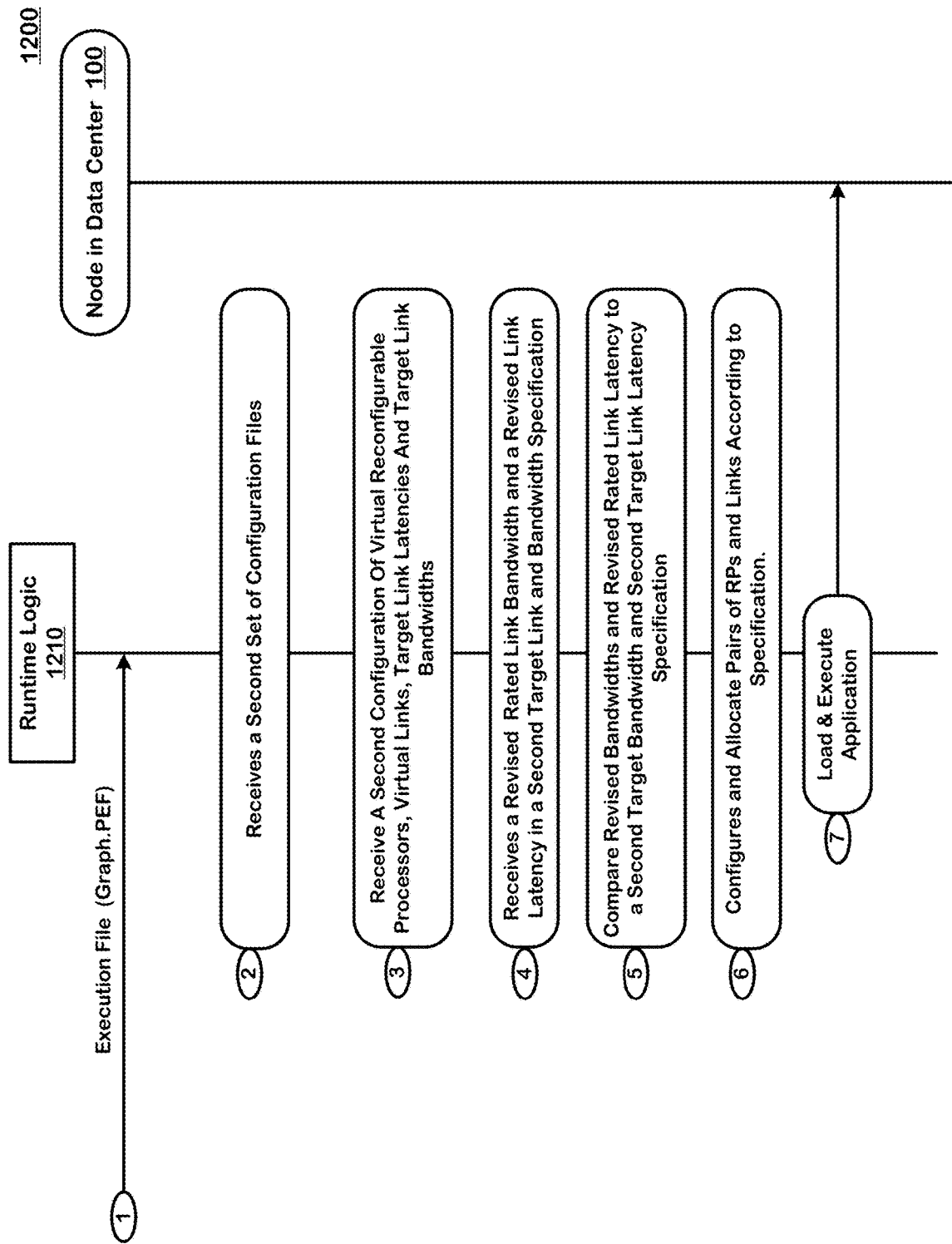
FIG. 12 is a message sequence chart illustrating one implementation of a data processing system executing a second application using the disclosed resource allocation for reconfigurable processors based on link bandwidth and link latency.

FIG. 12 is a message sequence chart 1200 illustrating one implementation of a data processing system executing a second application using the disclosed resource allocation for reconfigurable processors based on link bandwidth and link latency. A runtime logic 1210 compares a target link latency and target bandwidth specification to revised rated link latency and revised rated bandwidth values. Based on rated system dataflow resources available to meet target specifications, the runtime logic 1210 allocates pairs of reconfigurable processors and corresponding links for generating the configuration files used to load and execute an application.

At operation one, a compiler sends a second execution file comprising configuration files that define an application. At operation two, the runtime logic 1210 receives the second set of configuration files. At operation three, the second configuration of virtual reconfigurable processors, virtual links, target link latencies and target link bandwidths defining the application is processed by the runtime logic 1210. At operation four, the runtime logic 1210 receives a revised rated link bandwidth, and a revised link latency in a second target link bandwidth and target link latency specification. At operation five, the runtime logic 1210 compares the revised rated link bandwidth to the second target link bandwidth defined by the second specification and compares the revised rated link latency to the second target link latency defined by the second specification. At operation six, the runtime logic 1210 configures and allocate pairs of reconfigurable processors and links according to the second specification. At operation seven, the runtime logic 1210 loads reconfigurable processors (e.g., RPs 142) with configuration files and executes the application on a first processing node in the data center of FIG. 1.

Other implementations may perform the operations in different orders and/or with different, fewer, or additional operations than the ones illustrated in FIG. 12. Multiple operations can be combined in some implementations. One skilled in the art will appreciate that, in FIG. 12, operation seven comprises streaming network packets between reconfigurable processors (e.g., RPs 142) and a host processor (e.g., host 102) on a same processing node over local links (e.g., PCIe links) using a protocol like Transmission Control Protocol (TCP).

Having described executing and generating applications over the same links for efficient streaming of data between processors on a same processing node and on different processing nodes, the discussion now continues with the respect to creating a routing table for an application.

Kernel Resource Manager

Figure 13:
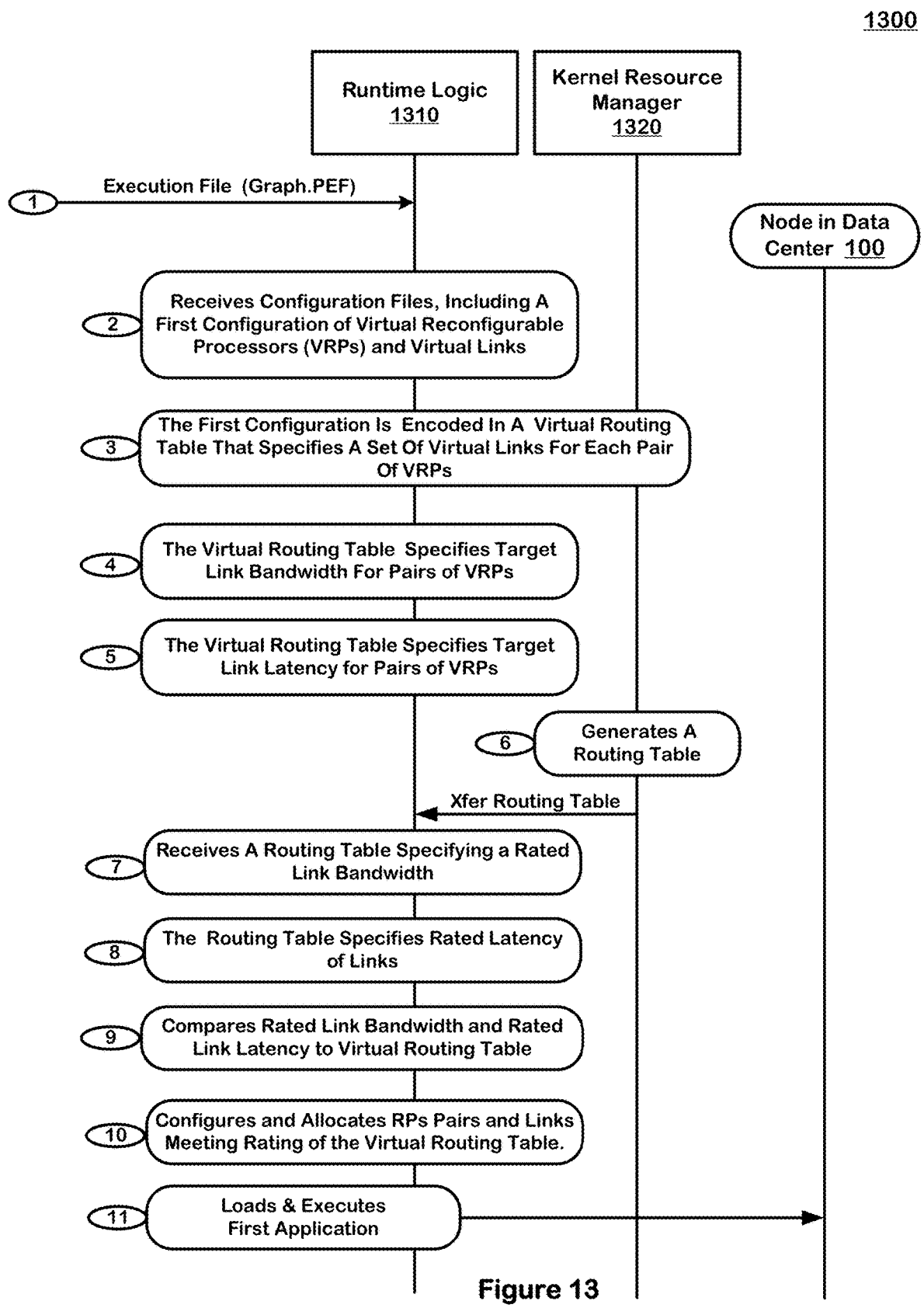
FIG. 13 is a message sequence chart illustrating one implementation of a data processing system executing an application using a routing table for the disclosed resource allocation for reconfigurable processors based on link bandwidth and link latency.

FIG. 13 is a message sequence chart 1300 illustrating one implementation of a data processing system executing an application, where a Kernel Resource Manager (KRM) provides a routing table for the resource allocation for reconfigurable processors based on link bandwidth and link latency. A runtime logic 1310 compares a target link latency and target link bandwidth specification to rated link latency and rated link bandwidth values. Based on rated system dataflow resources available to meet target specifications, the runtime logic 1310 allocates pairs of reconfigurable processors and corresponding links for generating the configuration files used to load and execute an application.

The Kernel Resource Manager (KRM) manages reconfigurable processors and associated hardware resources. It also has the view of the hardware topology that includes connectivity and proximity amongst hardware resources. When an application specifies hardware resources, the KRM examines the application against available resources and selects reconfigurable processors, device memory and links (e.g., PCIe lanes/ways) that maximize performance and minimize cost. The KRM provides a bandwidth and latency awareness for hardware resource partitioning and application scheduling.

At operation one, an execution file comprising configuration files that define an application is received by the runtime logic 1310. At operation two, the specification defining the application is processed by the runtime logic 1310, where the execution file provides a configuration of virtual reconfigurable processors and virtual links. At operation three, the runtime logic 1310 processes the configuration encoded in a first virtual routing table that specifies a set of virtual links for each pair of virtual reconfigurable processors in the first plurality of virtual reconfigurable processors. At operation four, the specification is further encoded in the first virtual routing table that specifies a target link bandwidth of each virtual link in the set of virtual links. At operation five, the specification is further encoded in the virtual routing table that specifies a target link latency of each virtual link in the set of virtual links. At operation six, the Kernel Resource Manager 1320 creates a routing table that specifies a set of links for each pair of reconfigurable processors in the plurality of reconfigurable processors available to execute the first application. At operation seven, the runtime logic 1310 receives from the Kernel Resource Manager 1320 generated routing table specifying a rated link bandwidth of each link in the set of links. At operation eight, the runtime logic 1310 receives the from Kernel Resource Manager 1320 generated routing table that specifies a rated link latency of each link in the set of links. At operation nine, the runtime logic 1310 compares the rated link bandwidth and latency to target link bandwidth and latency of the virtual links defined by the specification. At operation ten, the runtime logic 1310 configures the allocated pairs of reconfigurable processors and allocated links with the configuration data in the configuration files. At operation eleven, the runtime logic 1310 loads and executes the application using the configured pairs of reconfigurable processors and the configured links on a first processing node in the data center of FIG. 1.

In some implementations, the specification includes metadata header files. In some implementations, operations seven and eight are reversed with operation eight preceding operation seven. Other implementations may perform the operations in different orders and/or with different, fewer, or additional operations than the ones illustrated in FIG. 13. Multiple operations can be combined in some implementations. One skilled in the art will appreciate that, in FIG. 13, operation eleven comprises streaming network packets between reconfigurable processors (e.g., RPs 142) and a host processor (e.g., host 102) on a same processing node over local links (e.g., PCIe links) using a protocol like Transmission Control Protocol (TCP).

Having described the Kernel Resource Manager, we now return to executing and generating applications concurrently over the shared links for efficiently streaming data between processors on a same processing node and on different processing nodes of execution files disclosed by the technology disclosed.

Executing First and Second Applications in Parallel

Figure 14:
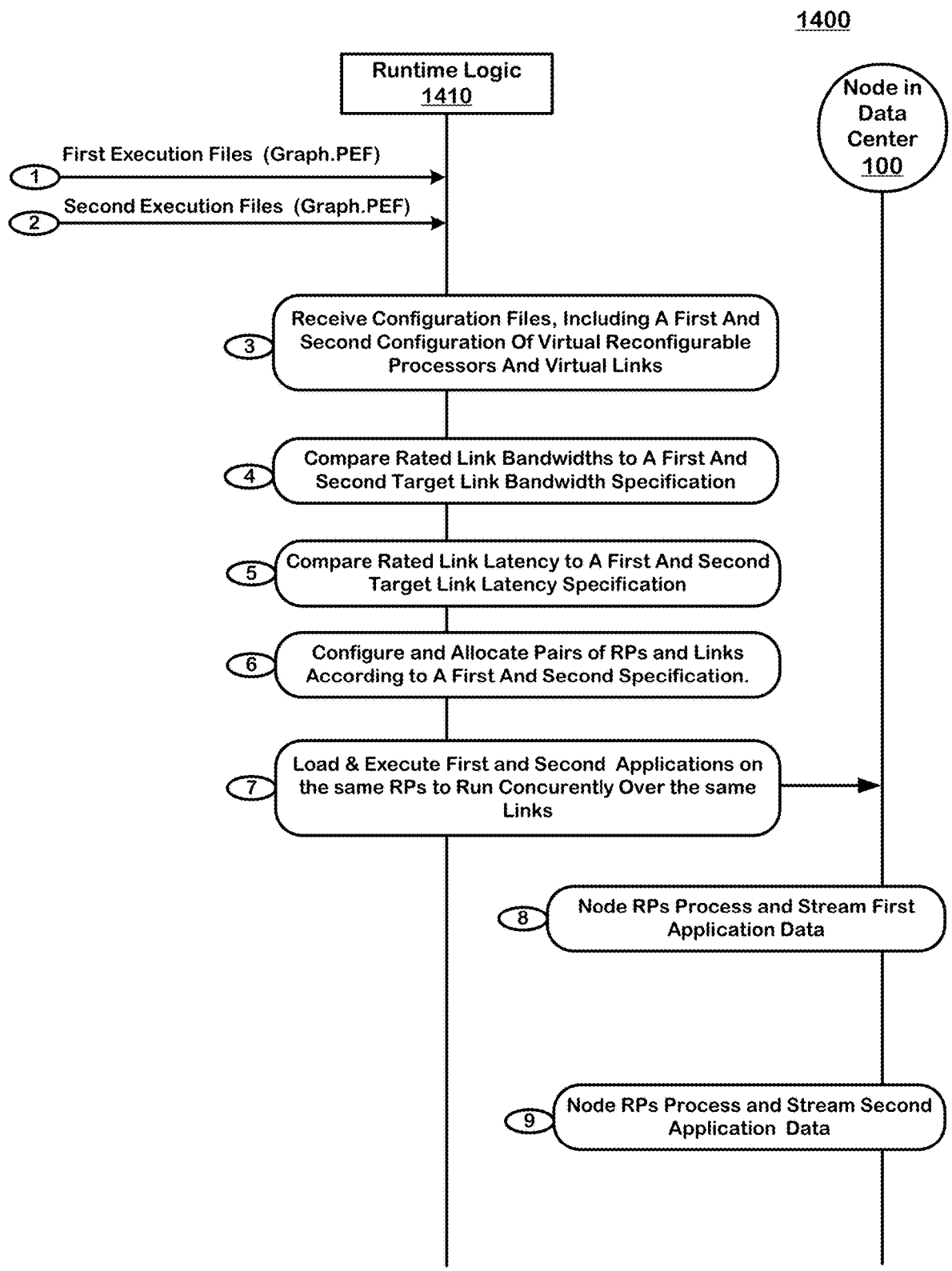
FIG. 14 is a message sequence chart illustrating one implementation of a data processing system executing first and second applications using the disclosed resource allocation for reconfigurable processors based on link bandwidth and link latency.

FIG. 14 is a message sequence chart 1400 illustrating one implementation of a data processing system executing first and second applications using the disclosed resource allocation for reconfigurable processors based on link bandwidth and link latency. A runtime logic 1410 compares a target link latency and target link bandwidth specification to rated link latency and rated link bandwidth values. Based on rated system dataflow resources available to meet target specifications, the runtime logic 1410 allocates pairs of reconfigurable processors and corresponding links for generating the configuration files used to load and execute an application in parallel.

At operation one, the runtime logic 1410 receives the first execution file comprising configuration files that define an application. At operation two, a second execution file comprising configuration files that define a second application is received by the runtime logic 1410. At operation three, the configuration files, including the first and second configurations of virtual reconfigurable processors and virtual links defining each application, are processed by the runtime logic 1410. At operation four, the runtime logic 1410 compares the rated link bandwidth to target link bandwidth of the virtual links defined by the first and second specifications. At operation five, the runtime logic 1410 compares the rated link latency to target link latency of the first and second virtual links specification. At operation six, the runtime logic 1410 configures and allocates pairs of reconfigurable processors and links according to the first and second specifications. At operation seven, the runtime logic 1410 loads reconfigurable processors (e.g., RPs 142) with configuration files and executes the first and second applications. At operation eight, the reconfigurable processors process and stream first application data. At operation nine, the reconfigurable processors process and stream second application data. The streaming of data is on a first processing node in the data center of FIG. 1.

In some implementations, the operations four and five are reversed with operation five preceding operation four. Other implementations may perform the operations in different orders and/or with different, fewer, or additional operations than the ones illustrated in FIG. 14. Multiple operations can be combined in some implementations. One skilled in the art will appreciate that, in FIG. 14, operation eleven comprises streaming network packets between reconfigurable processors (e.g., RPs 142) and a host processor (e.g., host 102) on a same processing node over local links (e.g., PCIe links) using a protocol like Transmission Control Protocol (TCP).

The application may include data and functions. Examples of the data include scalar data (e.g., control bits) and vector data (e.g., vectors, tensors, arguments, commands). The data can further include weights, coefficients, image data, audio data, Natural Language Processing data, control data (e.g., control tokens). Examples of functions in the plurality of functions include non-linearities like Rectified Linear Unit (ReLU) and its variants (e.g., leaky ReLU), hyperbolic tangent, sigmoid, and softmax, element-wise addition, matrix multiplication (e.g., General Matrix Multiply (GeMM)), layer normalization (e.g., batch normalization), loss functions like cross-entropy, and tensor shape modifiers like transpose.

One skilled in the art will appreciate that, in FIG. 14, streaming network packets between reconfigurable processors (e.g., RPs 142) and a host processor (e.g., host 102) on a same processing node over local links (e.g., PCIe links) can use a protocol like Transmission Control Protocol (TCP). Other links include for example (e.g., Ethernet, InfiniBand (IB)) using protocols like RDMA over Converged Ethernet (RoCE), TCP, User Datagram Protocol (UDP), and Quick UDP Internet Connections (QUIC).

Figure 15:
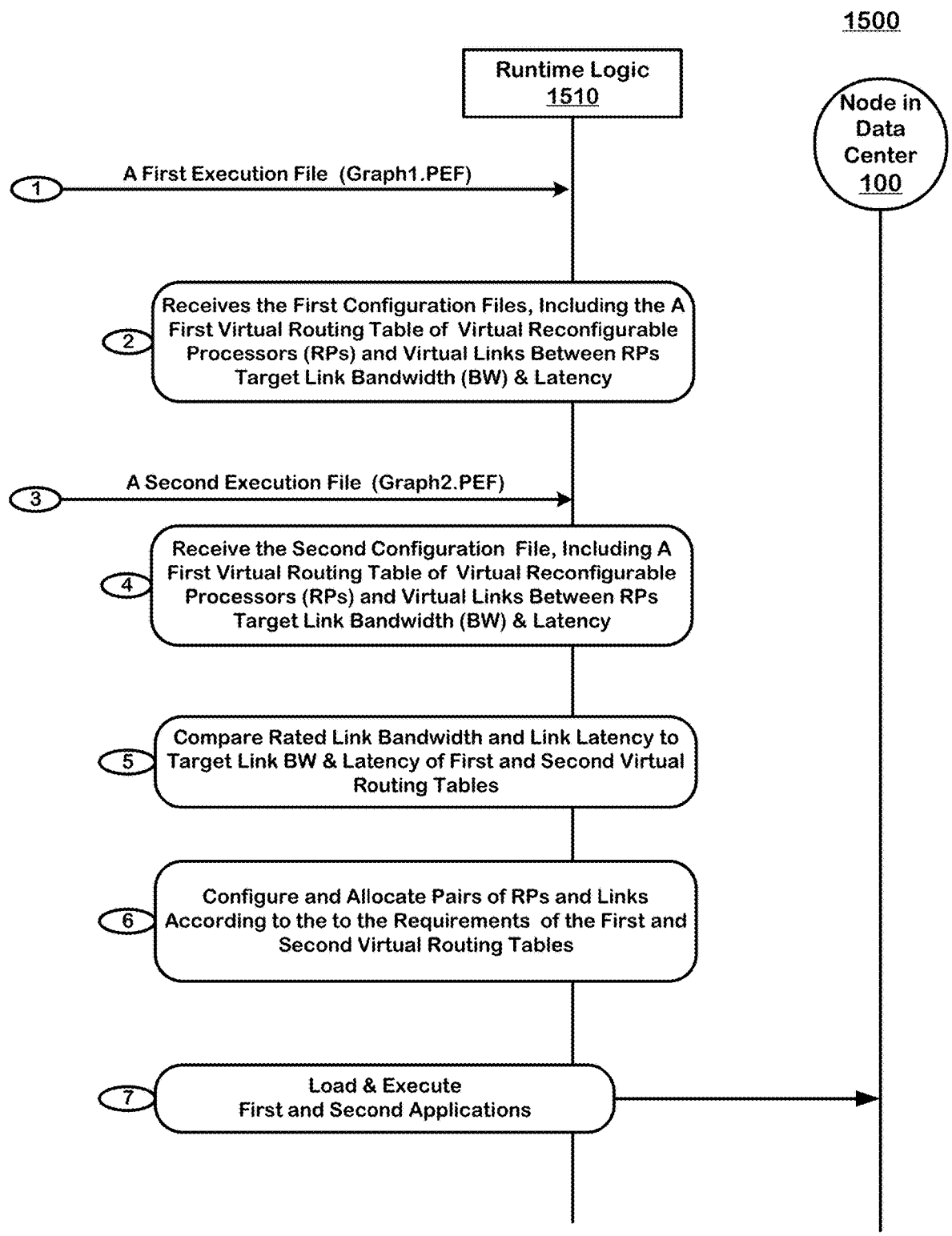
FIG. 15 is a message sequence chart illustrating one implementation of a data processing system executing first and second applications, such that first and second virtual routing tables are used for the disclosed resource allocation for reconfigurable processors based on link bandwidth and link latency.

FIG. 15 is a message sequence chart 1500 illustrating one implementation of a data processing system executing first and second applications, such that first and second virtual routing tables are used for resource allocating reconfigurable processors based on link bandwidth and link latency.

At operation one, runtime logic 1510 receives a first execution file comprising configuration files that define an application. At operation two, the runtime logic 1510 processes the first specification defining the application, where the execution file provides a first virtual routing table that specifies a first plurality of virtual reconfigurable processors required to execute the first application, and target link bandwidths and target link latencies of virtual links between the virtual reconfigurable processors in the first plurality of virtual reconfigurable processors. At operation three, the runtime logic 1510 receives a second execution file comprising configuration files that define an application. At operation four, the runtime logic 1510 receives a second virtual routing table that specifies a second plurality of virtual reconfigurable processors required to execute the second application, and target link bandwidths and target link latencies of virtual links between the virtual reconfigurable processors in the second plurality of virtual reconfigurable processors. At operation five, the runtime logic 1510 compares the two specifications encoded in the first and second virtual routing tables that specify a target link latency and a target link bandwidth of each virtual link in the first and second sets of virtual links and to the rated link latencies and rated link bandwidths. At operation six, the runtime logic 1510 configures and allocates pairs of reconfigurable processors and links as defined by the specifications according to the first and second virtual routing tables that meet rated requirements. At operation seven, the runtime logic 1510 loads and executes the first and second applications using the configured pairs of reconfigurable processors and the configured links on a first processing node in the data center of FIG. 1.

In some implementations, operations seven and eight are reversed with operation eight preceding operation seven. Other implementations may perform the operations in different orders and/or with different, fewer, or additional operations than the ones illustrated in FIG. 15. Multiple operations can be combined in some implementations. One skilled in the art will appreciate that, in FIG. 15, operation eleven comprises streaming network packets between reconfigurable processors (e.g., RPs 142) and a host processor (e.g., host 102) on a same processing node over local links (e.g., PCIe links) using a protocol like Transmission Control Protocol (TCP).

Example Reconfigurable Processor

Figure 16:
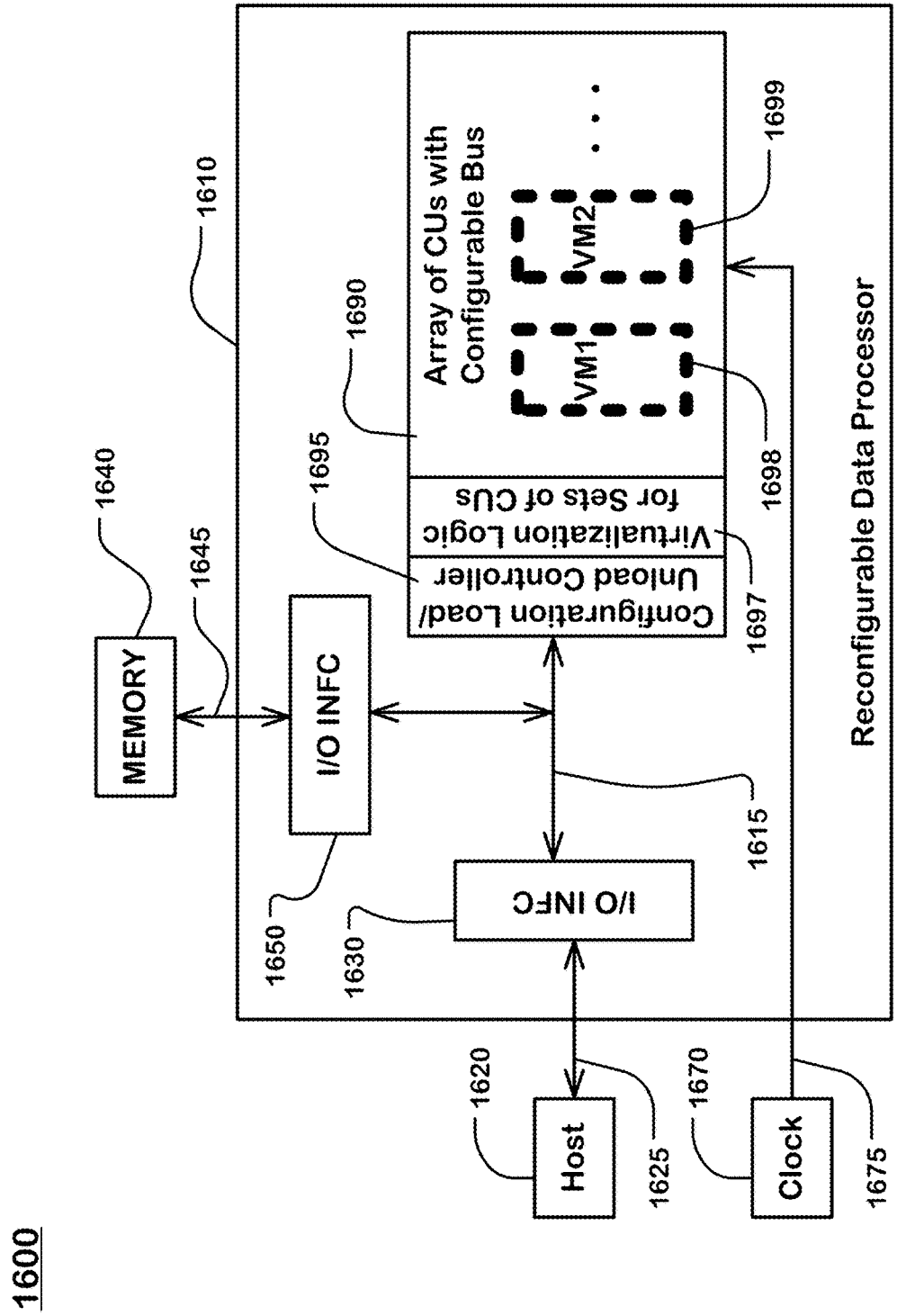
FIG. 16 is a system diagram illustrating a system including a host, a memory, and an example reconfigurable data processor on which the technology disclosed can be applied.

FIG. 16 is a diagram illustrating a system 1600 including a host 1620, a memory 1640, and a reconfigurable data processor 1610 in which a computation unit as described herein is deployed by hardware or by configuration of reconfigurable components and configured with the virtualization logic 1697. As shown in the example of FIG. 16, the reconfigurable data processor 1610 includes an array 1690 of configurable units and a configuration load/unload controller 1695.

The virtualization logic 1697 can include resources that support or enable simultaneous execution of multiple, unrelated application graphs (or related ones) in an array of configurable units on one die or one multi-chip modules. In the illustration, a first application graph is implemented in virtual machine VM1 in a particular set 1698 of configurable units, and a second application graph is implemented in virtual machine VM2 in another set 1699 of configurable units.

Figure 19:
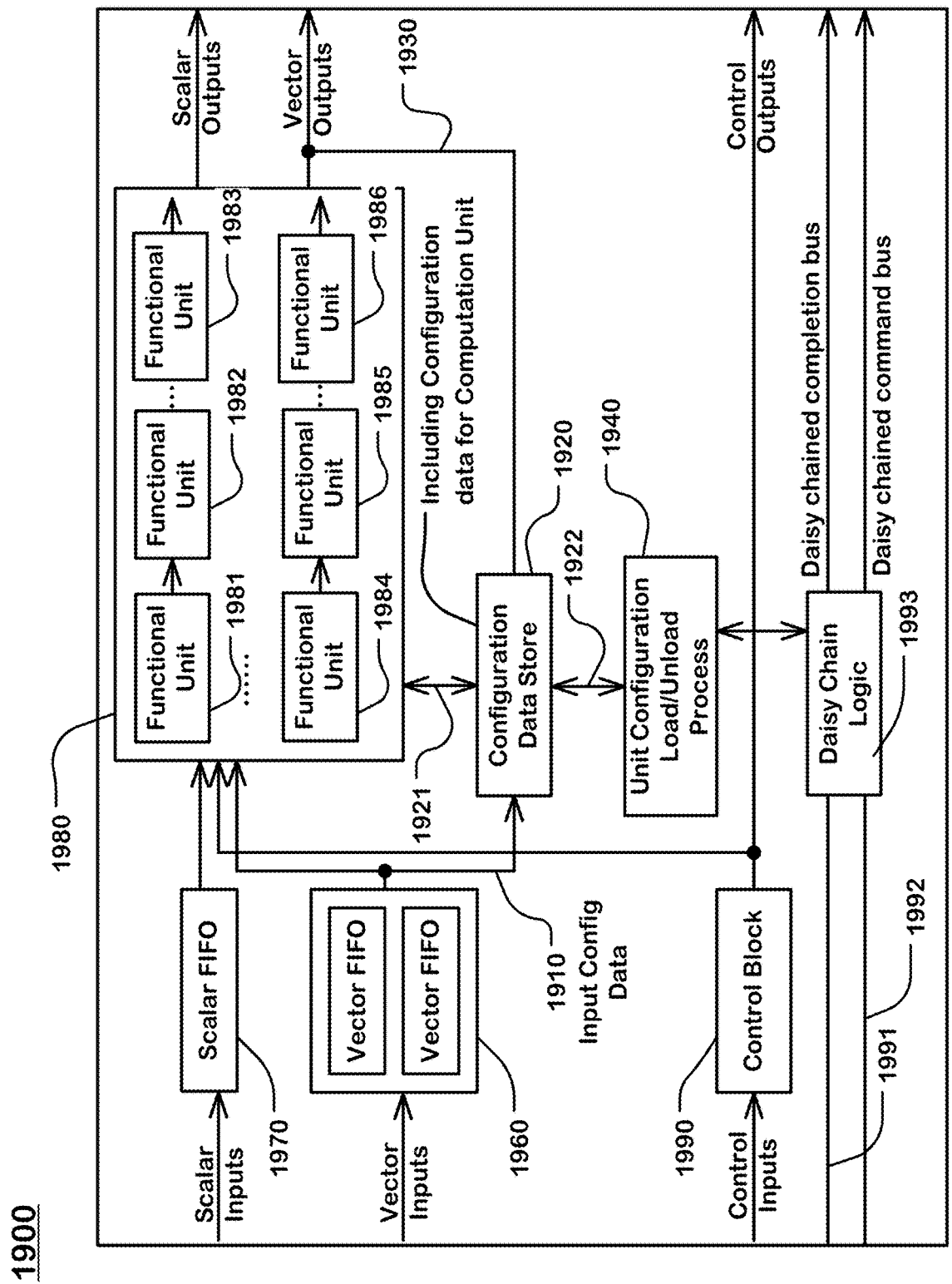
FIG. 19 is a block diagram illustrating an example configurable unit 1900, such as a Pattern Compute Unit (PCU), which is configured with the virtualization logic 1697.
Figure 20:
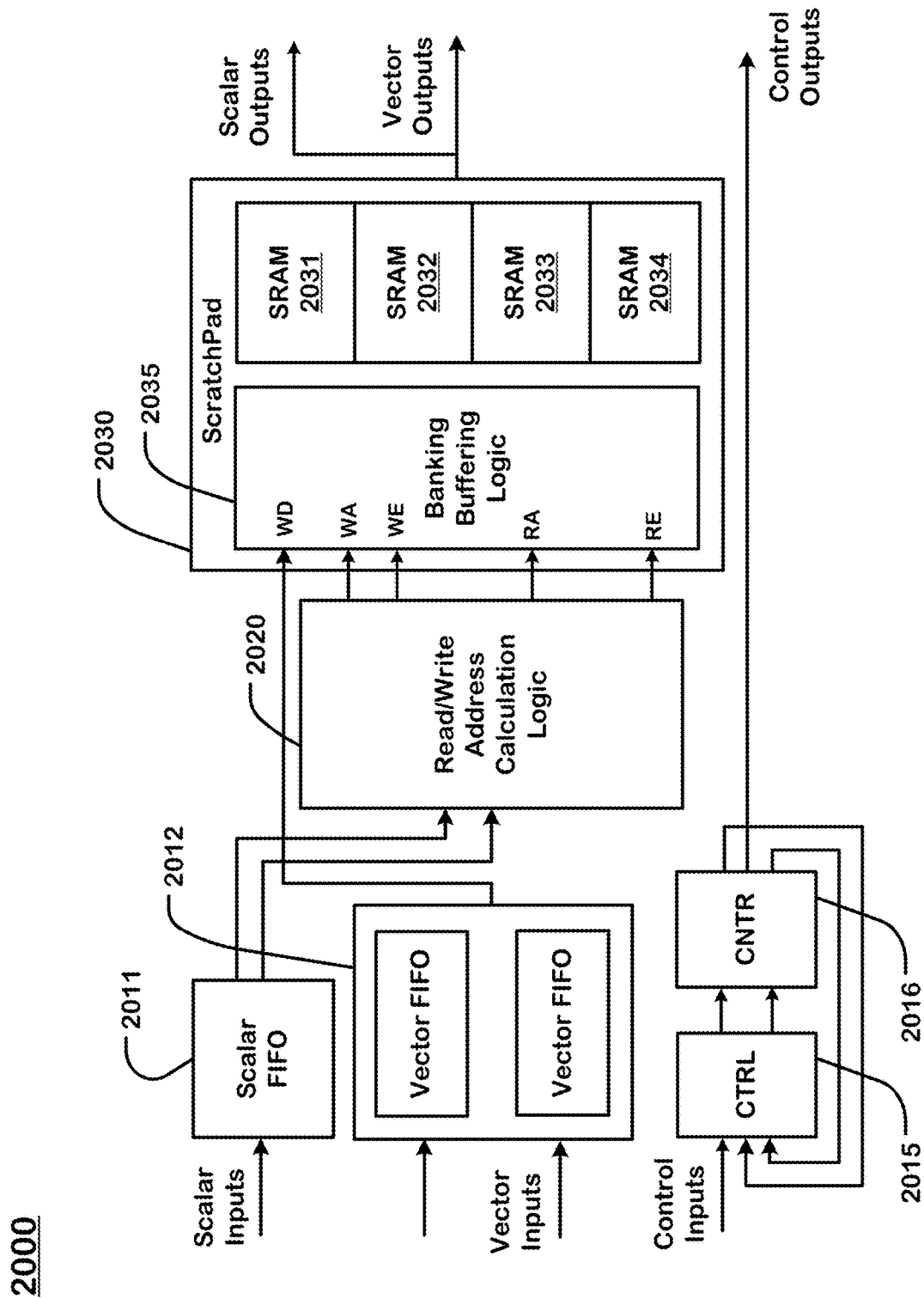
FIG. 20 is a block diagram illustrating an example configurable unit, such as a Pattern Memory Unit (PMU).

Configurable units in an array 1690 of configurable units are further described in reference to FIGS. 19 and 20 and configured with the virtualization logic 1697. Configurable units can include, or can have units configured to implement, a computation unit or computation units, as described herein.

The reconfigurable data processor 1610 includes an external I/O interface 1630 connected to the host 1620 by line 1625, and an external I/O interface 1650 connected to the memory 1640 by line 1645. The I/O interfaces 1630, 1650 connect via a bus system 1615 to the array 1690 of configurable units and to the configuration load/unload controller 1695. The bus system 1615 may have a bus width of carrying one chunk of data, which can be for this example 128 bits (references to 128 bits throughout can be considered as an example chunk size more generally).

To configure configurable units in the array 1690 of configurable units with a configuration file, the host 1620 can send the configuration file to the memory 1640 via the I/O interface 1630, the bus system 1615, and the I/O interface 1650 in the reconfigurable data processor 1610. The configuration file can be loaded in many ways, as suits a particular architecture, including in data paths outside the reconfigurable configurable processor 1610. The configuration file can be retrieved from the memory 1640 via the I/O interface 1650. Chunks of the configuration file can then be sent in a distribution sequence to configurable units in the array 1690 of configurable units in the reconfigurable data processor 1610.

An external clock generator 1670 or other clock line sources can provide a clock line 1675 or clock lines to elements in the reconfigurable data processor 1610, including the array 1690 of configurable units, and the bus system 1615, and the external data I/O interfaces 1630 and 1650. The bus system 1615 can communicate data at a processor clock rate via a clock line 1675 or clock lines.

Figure 17:
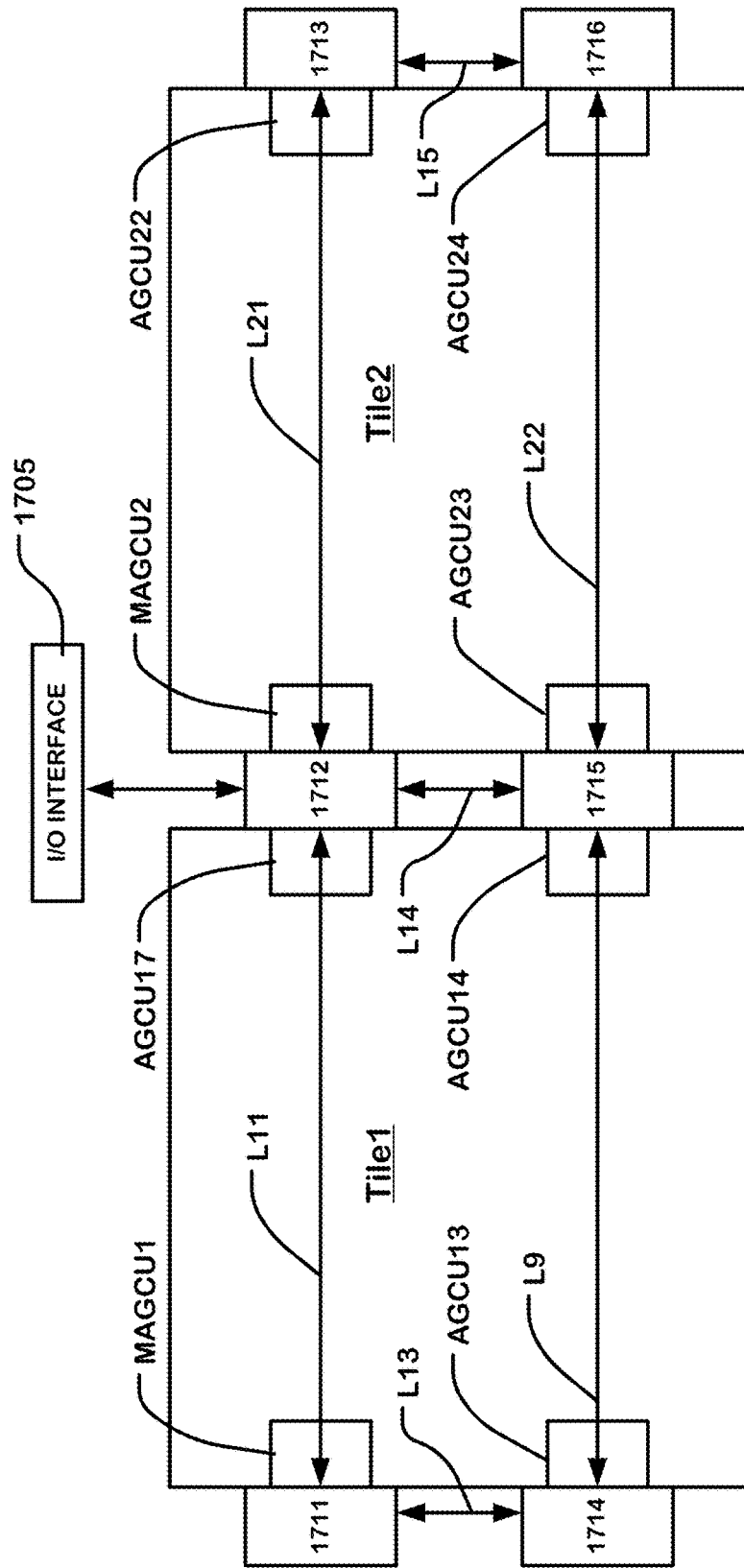
FIG. 17 is a simplified block diagram of a top-level network and components of a CGRA (Coarse-Grained Reconfigurable Architecture).

FIG. 17 is a simplified block diagram of components of a CGRA (Coarse-Grained Reconfigurable Architecture) processor. In this example, the CGRA processor has 2 tiles (Tile1, Tile2). The tile comprises an array of configurable units connected to a bus system, including array level networks in this example. An array of configurable units (e.g., 1690, FIG. 16) in the tile includes computation units in hardware or by configuration of reconfigurable components, which are configured with the virtualization logic 1697. The bus system includes a top-level network connecting the tiles to external I/O interface 1705 (or any number of interfaces). In other embodiments, different bus system configurations may be utilized. The configurable units in each tile are nodes on the array level network in this embodiment.

Each of the tiles has 4 AGCUs (Address Generation and Coalescing Units) (e.g., MAGCU1, AGCU17, AGCU13, AGCU14). The AGCUs are nodes on the top-level network and nodes on the array level networks and include resources for routing data among nodes on the top-level network and nodes on the array level network in each tile.

Nodes on the top-level network in this example include one or more external I/Ss, including interface 1705. The interfaces to external devices include resources for routing data among nodes on the top-level network and external devices, such as high-capacity memory, host processors, other CGRA processors, FPGA devices and so on, that are connected to the interfaces.

One of the AGCUs in a tile is configured in this example to be a master AGCU, which includes an array configuration load/unload controller for the tile. In other embodiments, more than one array configuration load/unload controller can be implemented, and one array configuration load/unload controller may be implemented by logic distributed among more than one AGCU.

The MAGCU1 includes a configuration load/unload controller for Tile1, and MAGCU2 includes a configuration load/unload controller for Tile2. In other embodiments, a configuration load/unload controller can be designed for loading and unloading configuration of more than one tile. In other embodiments, more than one configuration controller can be designed for configuration of a single tile. Also, the configuration load/unload controller can be implemented in other portions of the system, including as a stand-alone node on the top-level network and the array level network or networks.

The top-level network is constructed using top-level switches (1711-1716) connecting to each other as well as to other nodes on the top-level network, including the AGCUs, and I/O interface 1705. The top-level network includes links (e.g., L11, L9, L21, L22) connecting the top-level switches. Data travels in packets between the top-level switches on the links, and from the switches to the nodes on the network connected to the switches. For example, top-level switches 1711 and 1712 are connected by a link L11, top-level switches 1714 and 1715 are connected by a link L9, top-level switches 1711 and 1714 are connected by a link L13, top-level switches 1715 and 1712 are connected by a link L14, top-level switches 1713 and 1716 are connected by a link L15, and top-level switches 1712 and 1713 are connected by a link L21. The links can include one or more buses and supporting control lines, including for example a chunk-wide bus (vector bus). For example, the top-level network can include data, request and response channels operable in coordination for transfer of data in a manner analogous to an AXI compatible protocol. See, AMBA® AXI and ACE Protocol Specification, ARM, 2017.

Top-level switches can be connected to AGCUs. For example, top-level switches 1711, 1712, 1714, and 1715 are connected to MAGCU1, AGCU17, AGCU14 and AGCU15 in the tile Tile1, respectively. Top-level switches 1712, 1713, 1715, and 1716 are connected to MAGCU2, AGCU22, AGCU23 and AGCU24 in the tile Tile2, respectively.

Top-level switches can be connected to one or more external I/O interfaces (e.g., interface 1705).

Figure 18A:
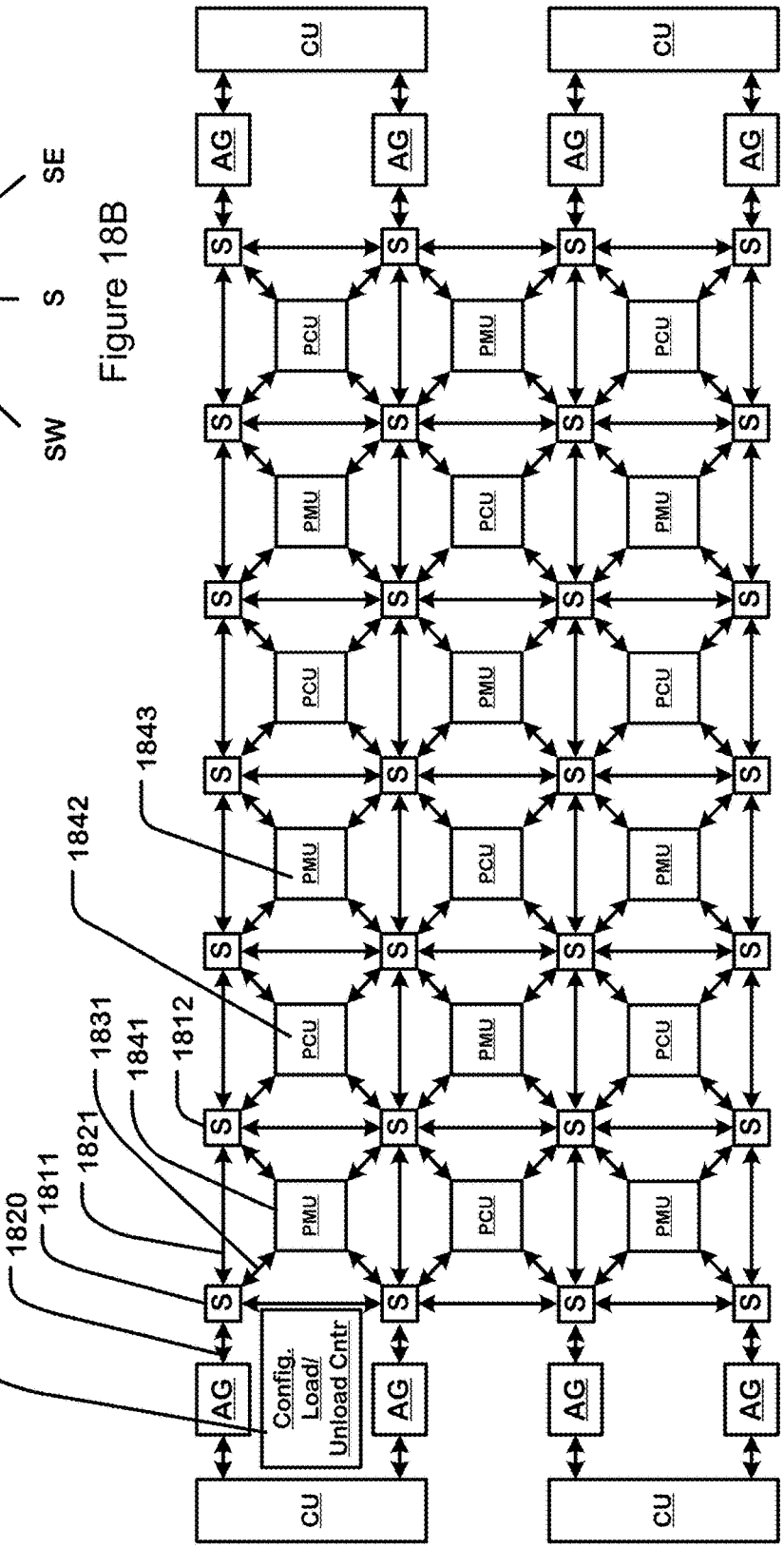
FIG. 18A is a simplified diagram of a tile and an array level network usable in the configuration of FIG. 17, where the configurable units are nodes on the array level network and are configurable to implement a Look-Up Table with input offsetting.
Figure 18B:
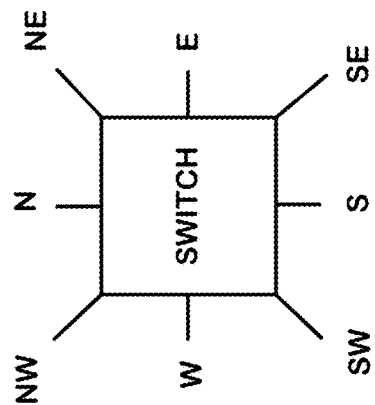
FIG. 18B illustrates an example Switch unit connecting elements in an array level network.

FIG. 18A is a simplified diagram of a tile and an array level network usable in the configuration of FIG. 17, where the configurable units in the array are nodes on the array level network and are configurable to implement a Look-Up Table with input offsetting. In this example, the array of configurable units 1800 includes a plurality of types of configurable units, which are configured with the virtualization logic 1697. The types of configurable units in this example include Pattern Compute Units (PCU), Pattern Memory Units (PMU), Switch units (S), and Address Generation and Coalescing Units (each including two address generators AG and a shared CU). For an example of the functions of these types of configurable units, see, Prabhakar et al., "Plasticine: A Reconfigurable Architecture For Parallel Patterns," ISCA '17, Jun. 24-28, 2017, Toronto, ON, Canada, which is incorporated by reference as if fully set forth herein. In this example, the PCUs (e.g., 1842) and PMUs (e.g., 1843) in the array of configurable units 1800 can include resources configurable for embodiment of a computation unit, an example configuration of which is described herein (FIGS. 18A, 18B, and 19). Each of these configurable units contains a configuration store comprising a set of registers or flip-flops that represent either the setup or the sequence to run a program, and can include the number of nested loops, the limits of each loop iterator, the routes and/or instructions to be executed for each stage including stages, the source of the operands, and the network parameters for the input and output interfaces. The configuration file can include entries of lookup tables as described herein.

Additionally, each of these configurable units contains a configuration store comprising a set of registers or flip-flops that store status usable to track progress in nested loops or otherwise. A configuration file in the configuration store contains a bit-stream representing the initial configuration, or starting state, of each of the components that execute the program. This bit-stream is referred to as a bit file. Program load is the process of setting up the configuration stores in the array of configurable units based on the contents of the bit file to allow the components to execute a program (i.e., a machine), including programs that utilize the virtualization logic 1697. Program Load may also require the load of all PMU memories.

The array level network includes links interconnecting configurable units in the array. The links in the array level network include one or more and, in this case, three kinds of physical buses: a chunk-level vector bus (e.g., 128 bits of data), a word-level scalar bus (e.g., 32 bits of data), and a multiple bit-level control bus. For instance, interconnect 1821 between switch units 1811 and 1812 includes a vector bus interconnect with a vector bus width of 128 bits, a scalar bus interconnect with a scalar bus width of 32 bits, and a control bus interconnect.

The three kinds of physical buses differ in the granularity of data being transferred. In one embodiment, the vector bus can carry a chunk that includes 16-Bytes (=128 bits) of data as its payload. The scalar bus can have a 32-bit payload and carry scalar operands or control information. In some machines implemented using this system, data can be represented using floating point data formats, including standard or non-standard formats. Example formats include FP32 and BF16, among others. It can be understood that the number of data values carried on the scalar and vector buses is a function of the encoding format of the data values, with FP32 utilizing 32 bits per value and BF16 using 16 bits per value.

The control bus can carry control handshakes such as tokens and other lines. The vector and scalar buses can be packet switched, including headers that indicate a destination of each packet and other information such as sequence numbers that can be used to reassemble a file when the packets are received out of order. Each packet header can contain a destination identifier that identifies the geographical coordinates of the destination Switch unit (e.g., the row and column in the array), and an interface identifier that identifies the interface on the destination switch (e.g., North, South, East, West, etc.) used to reach the destination unit. The control network can be circuit switched based on timing circuits in the device, for example. The configuration load/unload controller can generate a header for each chunk of configuration data of 128 bits. The header is transmitted on a header bus to each configurable unit in the array of configurable unit.

In one example, a chunk of data of 128 bits is transmitted on the vector bus that provides the chunk as vector inputs to a configurable unit. The vector bus can include 128 payload lines, and a set of header lines. The header can include a sequence ID for each chunk, which can include:

A bit to indicate if the chunk is scratchpad memory or configuration store data.
Bits that form a chunk number.
Bits that indicate a column identifier.
Bits that indicate a row identifier.
Bits that indicate a component identifier.

For a load operation, the configuration load controller can send the number N of chunks to a configurable unit in order from N−1 to 0. For this example, the 6 chunks are sent out in most-significant-bit-first order of Chunk 5→Chunk 4→Chunk 3→Chunk 2→Chunk 1→Chunk 0. (Note that this most-significant-bit-first order results in Chunk 5 being distributed in round 0 of the distribution sequence from the array configuration load controller.) For an unload operation, the configuration unload controller can write the unload data out of order to the memory. For both load and unload operations, the shifting in the configuration serial chains in a configuration data store in a configurable unit is from LSB (Least-Significant-Bit) to MSB (Most-Significant-Bit), or MSB out first.

FIG. 18B illustrates an example Switch unit connecting elements in an array level network. As shown in the example of FIG. 18B, a Switch unit can have 8 interfaces. The North, South, East and West interfaces of a switch unit are used for connections between switch units. The Northeast, Southeast, Northwest, and Southwest interfaces of a switch unit are each used to make connections to PCU or PMU instances. A set of 2 Switch units in each tile quadrant have connections to an Address Generation and Coalescing Unit (AGCU) that include multiple Address Generation (AG) units and a Coalescing Unit (CU) connected to the multiple Address Generation units. The Coalescing Unit (CU) arbitrates between the AGs and processes memory requests. Each of the 8 interfaces of a switch unit can include a vector interface, a scalar interface, and a control interface to communicate with the vector network, the scalar network, and the control network.

During execution of a machine after configuration, data can be sent via one or more unit switches and one or more links between the unit switches to the configurable units using the vector bus and vector interface(s) of the one or more Switch units on the array level network.

In embodiments described herein, a configuration file or bit file, before configuration of the tile, can be sent from the configuration load controller using the same vector bus, via one or more unit switches and one or more links between the unit switches to the configurable unit using the vector bus and vector interface(s) of the one or more switch units on the array level network. For instance, a chunk of configuration data in a unit file particular to a configurable unit PMU 1841 can be sent from the configuration load/unload controller 1801 to the PMU 1841, via a link 1820 between the configuration load/unload controller 1801 and the West (W) vector interface of the switch unit 1811, the switch unit 1811, and a link 1831 between the Southeast (SE) vector interface of the switch unit 1811 and the PMU 1841.

In this example, one of the AGCUs is configured to be a master AGCU, which includes a configuration load/unload controller (e.g., 1801). The master AGCU implements a register through which the host (1620, FIG. 16) can send commands via the bus system to the master AGCU. The master AGCU controls operations on an array of configurable units in a tile and implements a program control state machine to track the state of the tile based on the commands it receives from the host through writes to the register. For every state transition, the master AGCU issues commands to all components on the tile over a daisy-chained command bus (FIG. 16). The commands include a program reset command to reset configurable units in an array of configurable units in a tile, and a program load command to load a configuration file to the configurable units.

The configuration load controller in the master AGCU is responsible for reading the configuration file from the memory and sending the configuration data to every configurable unit of the tile. The master AGCU can read the configuration file from the memory at preferably the maximum throughput of the top-level network. The data read from memory are transmitted by the master AGCU over the vector interface on the array level network to the corresponding configurable unit according to a distribution sequence described herein.

In one embodiment, in a way that can reduce the wiring requirements within a configurable unit, configuration and status registers holding unit files to be loaded in a configuration load process, or unloaded in a configuration unload process, in a component are connected in a serial chain and can be loaded through a process of shifting bits through the serial chain. In some embodiments, there may be more than one serial chain arranged in parallel or in series. When a configurable unit receives the for example 128 bits of configuration data from the master AGCU in one bus cycle, the configurable unit shifts this data through its serial chain at the rate of 1 bit per cycle, where shifter cycles can run at the same rate as the bus cycle. It will take 128 shifter cycles for a configurable unit to load 128 configuration bits with the 128 bits of data received over the vector interface. The 128 bits of configuration data are referred to as a chunk. A configurable unit can require multiple chunks of data to load all its configuration bits.

The configurable units interface with the memory through multiple I/O interfaces (1650, FIG. 16). Each of the memory interfaces can be accessed using several AGCUs. Each AGCU contains a reconfigurable scalar data path to generate requests for the off-chip memory. Each AGCU contains FIFOs (First-In-First-Out buffers for organizing data) to buffer outgoing commands, data, and incoming responses from the off-chip memory.

FIG. 19 is a block diagram illustrating an example configurable unit 1900, such as a Pattern Compute Unit (PCU), which is configured with the virtualization logic 1697. A configurable unit can interface with the scalar, vector, and control buses, in this example using three corresponding sets of Inputs and Outputs (IO): scalar inputs/outputs, vector inputs/outputs, and control inputs/outputs. Scalar IOs can be used to communicate single words of data (e.g., 32 bits). Vector IOs can be used to communicate chunks of data (e.g., 128 bits), in cases such as receiving configuration data in a unit configuration load process and transmitting and receiving data during operation after configuration across a long pipeline between multiple PCUs. Control IOs can be used to communicate signals on control lines such as the start or end of execution of a configurable unit. Control inputs are received by control block 1990, and control outputs are provided by the control block 1990.

Each vector input is buffered in this example using a vector FIFO in a vector FIFO block 1960 which can include one or more vector FIFOs. Likewise, in this example, each scalar input is buffered using a scalar FIFO 1970. Using input FIFOs decouples timing between data producers and consumers and simplifies inter-configurable-unit control logic by making it robust to input delay mismatches.

A configurable unit includes multiple reconfigurable data paths in block 1980. A data path in a configurable unit can be organized as a multi-stage (Stage 1 . . . Stage N), reconfigurable SIMD (Single Instruction, Multiple Data) pipeline. The chunks of data pushed into the configuration serial chain in a configurable unit include configuration data for each stage of each data path in the configurable unit. The configuration serial chain in the configuration data store 1920 is connected to the multiple data paths in block 1980 via lines 1921.

A configurable data path organized as a multi-stage pipeline can include multiple functional units (e.g., 1981, 1982, 1983, 1984, 1985, 1986) at respective stages. A computation unit or parts of a computation unit can be implemented in multiple functional units at respective stages in a multi-stage pipeline or in multiple multi-stage pipelines, as described in FIG. 15. In the example as shown in FIG. 15, a circuit including the virtualization logic 1697 can be implemented in multiple functional units and multiple memory units. Input registers in functional units can register inputs from scalar FIFOs 1970 or Vector FIFOs 1960 or from previous stages in a multi-stage pipeline. A functional unit at a stage in a multi-stage pipeline can execute a function, e.g., logical shift, an arithmetic function, comparison, a logical operation, etc., and generate an output.

Configurable units in the array of configurable units include configuration data stores 1920 (e.g., serial chains) to store unit files comprising a plurality of chunks (or sub-files of other sizes) of configuration data particular to the corresponding configurable units. Configurable units in the array of configurable units each include unit configuration load/unload process logic 1940 connected to the configuration data store 1920 via line 1922, to execute a unit configuration load process. The unit configuration load process includes receiving, via the bus system (e.g., the vector inputs), chunks of a unit file particular to the configurable unit and loading the received chunks into the configuration data store 1920 of the configurable unit. The unit file loaded into the configuration data store 1920 can include configuration data, including opcodes and routing configuration, for circuits (e.g., module) implementing the virtualization logic 1697 in multiple functional units and multiple memory units, as described herein.

The configuration data stores in configurable units in the plurality of configurable units in this example comprise serial chains of latches, where the latches store bits that control configuration of the resources in the configurable unit. A serial chain in a configuration data store can include a shift register chain for configuration data and a second shift register chain for state information and counter values connected in series.

Input configuration data 1910 can be provided to a vector FIFO as vector inputs, and then be transferred to the configuration data store 1920. Output configuration data 1930 can be unloaded from the configuration data store 1920 using the vector outputs.

The CGRA uses a daisy-chained completion bus to indicate when a load/unload command has been completed. The master AGCU transmits the program load and unload commands to configurable units in the array of configurable units over a daisy-chained command bus. As shown in the example of FIG. 19, a control block 1990, a daisy-chained completion bus 1991 and a daisy-chained command bus 1992 are connected to daisy-chain logic 1993, which communicates with the unit configuration load logic 1940. The daisy-chain logic 1993 can include load complete status logic, as described below. The daisy-chained completion bus is further described below. Other topologies for the command and completion buses are clearly possible but not described here.

FIG. 20 is a block diagram illustrating an example configurable unit 2000, such as a Pattern Memory Unit (PMU), which is configured with the virtualization logic 1697 (i.e., the ready-to-read credit counter, the write credit counter, and the flow control logic for operating them). A PMU can contain scratchpad memory 2030 coupled with a reconfigurable scalar data path 2020 intended for address calculation (RA, WA) and control (WE, RE) of the scratchpad memory 2030, along with the bus interfaces used in the PCU (FIG. 19).

The bus interfaces can include scalar inputs, vector inputs, scalar outputs and vector outputs, usable to provide Write Data WD. The data path can be organized as a multi-stage reconfigurable pipeline, including stages of Functional Units FUs and associated Pipeline Registers PRs that register inputs and outputs of the functional units. PMUs can be used to store distributed on-chip memory throughout the array of reconfigurable units.

A scratchpad is built with multiple SRAM banks (e.g., 2031-2034). Banking buffering logic 2035 for the SRAM banks in the scratchpad can be configured to operate in several banking modes to support various access patterns. A computation unit as described herein can include a lookup table stored in the scratchpad memory 2030, from a configuration file or from other sources. In a computation unit as described herein, the scalar data path can translate a section of a raw input value I for addressing lookup tables implementing a function f(I), into the addressing format utilized by the SRAM scratchpad memory 2030, adding appropriate offsets and so on, to read the entries of the lookup table stored in the scratchpad memory 2030 using the sections of the input value I. Each PMU can include write address calculation logic and read address calculation logic 2020 that provide Write Address WA, Write Enable WE, Read Address RA and Read Enable RE to the banking buffering logic 2035. Based on the state of the local FIFOs 2011 and 2012 and external control inputs, the control block 2020 can be configured to trigger the Write Address computation, Read Address computation, or both, by enabling the appropriate counters 2016. A programmable counter chain (Control Inputs, Control Outputs) and control block 2020 can trigger PMU execution.

This is one simplified example of a configuration of a configurable processor for implementing a computation unit as described herein. The configurable processor can be configured in other ways to implement a computation unit. Other types of configurable processors can implement the computation unit in other ways. Also, the computation unit can be implemented using dedicated logic in some examples, or a combination of dedicated logic and instruction-controlled processors.

Other Implementations

A first example of accelerated deep learning is using a deep learning accelerator to train a neural network. A second example of accelerated deep learning is using a deep learning accelerator to operate a trained neural network to perform inferences. A third example of accelerated deep learning is using a deep learning accelerator to train a neural network and subsequently perform inference with any one or more of the trained neural networks, information from same, and a variant of same.

Examples of neural networks include Fully Connected Neural Networks (FCNNs), Recurrent Neural Networks (RNNs), Convolutional Neural Networks (CNNs), Long Short-Term Memory (LSTM) networks, autoencoders, deep belief networks, and Generative Adversarial Networks (GANs).

An example of training a neural network is determining one or more weights associated with the neural network, such as by hardware acceleration via a deep learning accelerator. An example of making an inference is using a trained neural network to compute results by processing input data based on weights associated with the trained neural network. As used herein, the term 'weight' is an example of a 'parameter' as used in various forms of neural network processing. For example, some neural network learning is directed to determining parameters that are then usable for performing neural network inferences using the parameters.

A neural network processes data according to a dataflow graph comprising layers of neurons. Stimuli (e.g., input data) are received by an input layer of neurons and the computed results of the dataflow graph (e.g., output data) are provided by an output layer of neurons. Example layers of neurons include input layers, output layers, rectified linear unit layers, fully connected layers, recurrent layers, long short-term memory layers, convolutional layers, kernel layers, dropout layers, and pooling layers. A neural network is conditionally and/or selectively trained, subject to hardware acceleration. After being trained, a neural network is conditionally and/or selectively used for inference, subject to hardware acceleration.

An example of a deep learning accelerator (chip) is one or more relatively specialized hardware elements operating in conjunction with one or more software elements to train a neural network and/or perform inference with a neural network relatively more efficiently than using relatively less specialized hardware elements. Some implementations of the relatively specialized hardware elements include one or more hardware logic circuitry elements such as transistors, resistors, inductors, capacitors, wire interconnects, combinatorial logic (e.g., NAND, NOR) gates, latches, register files, memory arrays, tags for memory arrays, content-addressable memories, flash, ROM, DRAM, SRAM, Serializer/Deserializer (SerDes), I/O drivers, and the like, such as implemented via custom logic, synthesized logic, ASICs, and/or FPGAs. Some of the relatively less specialized hardware elements include conventional CPUs and conventional GPUs.

An example of storage is one or more elements enabled to retain state information, e.g., any one or more of: a flip-flop, a latch or an array of latches, a register or an array of registers, a register file, a memory, a memory array, a magnetic storage device, an optical storage device, SRAM, DRAM, flash, and ROM. In various implementations storage is volatile (e.g., SRAM or DRAM) and/or non-volatile (e.g., flash or ROM).

An example of an Integrated Circuit (IC) is a collection of circuitries implemented on one or more portions of semiconductor material, such as a single die or a plurality of dice. An example of 3D-stacking of dice is providing mechanical connectivity and/or electrical connectivity between the dice, e.g., in a dimension orthogonal to a major surface of the dice, to form a unit. The mechanical connectivity and/or the electrical connectivity are variously implemented, e.g., via one or more of solder balls, microbumps, and through-silicon vias. An example of 2.5D stacking of dice is providing mechanical connectivity and/or electrical connectivity between the dice via a common element (e.g., a silicon interposer) to form a unit, where the mechanical connectivity and/or electrical connectivity between each die and the common substrate is in a dimension orthogonal to a major surface of the die. The mechanical connectivity and/or the electrical connectivity are variously implemented, e.g., via one or more of solder balls, microbumps, and through-silicon vias. An example of an Application-Specific Integrated Circuit (ASIC) is an IC designed for a particular use.

An example of a package is an element enabled to mechanically retain and/or contain one or more electronic circuits and/or to electrically interconnect one or more electronic circuits. Example electronic circuits are any one or more of one or more portions of semiconductor material, one or more dice, one or more interposers, and one or more substrates. Particular examples of packages include a BGA package and variants thereof. Some ICs comprise a package. An example of a substrate is an element to mechanically retain and/or electrically interconnect one or more dice and/or one or more packages. A particular example of a substrate is a PCB to, e.g., retain and interconnect packages.

Another particular example of a substrate is a silicon interposer to, e.g., couple one or more 3D-stacked or 2.5-stacked dice. Another particular example of a substrate is a package, e.g., retaining a plurality of dice.

The technology disclosed can be applied to other processors like Central Processing Units (CPUs), Graphics Processing Units (GPUs), Field Programmable Gate Arrays (FPGAs), Application-Specific Integrated Circuits (ASICs), Application Specific Instruction-set Processor (ASIP), and Digital Signal Processors (DSPs).

The applications can also be considered graphs, application graphs, dataflow graphs, control flow graphs, data and control flow graphs, user applications, models, deep learning applications, deep neural networks, programs, program images, processes, jobs, and tasks.

While the present invention is disclosed by reference to the preferred implementations and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following clauses.

What is claimed is:

1. A data processing system, comprising:
a pool of reconfigurable dataflow resources, reconfigurable dataflow resources in the pool of reconfigurable dataflow resources including a plurality of reconfigurable processors operatively coupled by links, and the links having rated link bandwidths and rated link latencies; and
runtime logic operatively coupled to the pool of reconfigurable dataflow resources, and configured to:
receive, for a first application,
a first plurality of configuration files,
a first configuration of a first plurality of virtual reconfigurable processors required to execute the first application, and virtual links between virtual reconfigurable processors in the first plurality of virtual reconfigurable processors, and
a first specification of target link bandwidths and target link latencies of the virtual links between the virtual reconfigurable processors in the first plurality of virtual reconfigurable processors;
allocate reconfigurable processors in the plurality of reconfigurable processors to the virtual reconfigurable processors in the first plurality of virtual reconfigurable processors, and links between the reconfigurable processors to the virtual links between the virtual reconfigurable processors in the first plurality of virtual reconfigurable processors based on
a link bandwidth comparison that compares the target link bandwidths, specified by the first specification, against the rated link bandwidths, and
a link latency comparison that compares the target link latencies, specified by the first specification, against the rated link latencies; and
configure the allocated reconfigurable processors and the allocated links with configuration data in the first plurality of configuration files, and execute the first application using the configured reconfigurable processors and the configured links.

* * * * *

UNITED STATES PATENT AND TRADEMARK OFFICE
CERTIFICATE OF CORRECTION

| | | |
|---|---|---|
| PATENT NO. | : 12,008,417 B2 | Page 1 of 1 |
| APPLICATION NO. | : 17/528081 | |
| DATED | : June 11, 2024 | |
| INVENTOR(S) | : Shenbagam et al. | |

It is certified that error appears in the above-identified patent and that said Letters Patent is hereby corrected as shown below:

On the Title Page

Item (72), add:
Pushkar Nandkar, Palo Alto, CA (US)

Signed and Sealed this
Third Day of June, 2025

Coke Morgan Stewart
*Acting Director of the United States Patent and Trademark Office*